(12) United States Patent
Takeo et al.

(10) Patent No.: US 12,195,944 B2
(45) Date of Patent: Jan. 14, 2025

(54) EXCAVATOR

(71) Applicant: SUMITOMO CONSTRUCTION MACHINERY CO., LTD., Tokyo (JP)

(72) Inventors: Jitsutaka Takeo, Chiba (JP); Kaoru Nakada, Chiba (JP)

(73) Assignee: SUMITOMO CONSTRUCTION MACHINERY CO., LTD., Tokyo (JP)

( * ) Notice: Subject to any disclaimer, the term of this patent is extended or adjusted under 35 U.S.C. 154(b) by 318 days.

(21) Appl. No.: 17/453,213

(22) Filed: Nov. 2, 2021

(65) Prior Publication Data

US 2022/0145587 A1 May 12, 2022

(30) Foreign Application Priority Data

Nov. 12, 2020 (JP) .................................. 2020-188896

(51) Int. Cl.
*E02F 9/08* (2006.01)
*E02F 9/22* (2006.01)
*E02F 3/32* (2006.01)

(52) U.S. Cl.
CPC .......... *E02F 9/0866* (2013.01); *E02F 9/2217* (2013.01); *E02F 3/32* (2013.01); *E02F 9/2228* (2013.01); *E02F 9/2285* (2013.01); *E02F 9/2292* (2013.01); *E02F 9/2296* (2013.01)

(58) Field of Classification Search
CPC ... E02F 9/32; E02F 9/16; E02F 9/2217; E02F 9/2228; E02F 9/2292; E02F 9/2296
USPC ....................................................... 180/68.1
See application file for complete search history.

(56) References Cited

U.S. PATENT DOCUMENTS

| 6,678,972 | B2* | 1/2004 | Naruse ..................... E02F 9/16 |
| | | | 903/903 |
| 8,037,963 | B2* | 10/2011 | Nishimura ............ E02F 9/2292 |
| | | | 180/291 |
| 8,631,890 | B2 | 1/2014 | Noguchi et al. |
| 9,290,906 | B2* | 3/2016 | Kobayashi ............ E02F 9/0883 |
| 9,353,673 | B2* | 5/2016 | Ge ......................... F04D 27/004 |
| 9,362,797 | B2* | 6/2016 | Murata ..................... B60L 50/10 |
| 10,000,908 | B2* | 6/2018 | Ota ............................ B60K 1/04 |
| 10,066,358 | B2* | 9/2018 | Ota ............................. F02B 63/04 |

(Continued)

FOREIGN PATENT DOCUMENTS

| DE | 112019000005 | 8/2020 |
| EP | 1935699 | 6/2008 |

(Continued)

*Primary Examiner* — Hau V Phan
(74) *Attorney, Agent, or Firm* — IPUSA, PLLC

(57) ABSTRACT

An excavator includes a lower traveling body, an upper turning body turnably mounted on the lower traveling body, actuators configured to drive driven portions including the lower traveling body and the upper turning body, a power storage mounted on the upper turning body and used as an energy source for driving the actuators, a cooling circuit configured to cool the power storage, and a fan mounted on the upper turning body and configured to blow air to a radiator and a condenser for cooling the radiator and the condenser. Further, the power storage is arranged such that the power storage is apart from a path in which air outside the upper turning body, by an operation of the fan, is introduced into inside the upper turning body, passes across the heat exchanging device, and is discharged to the outside of the upper turning body.

14 Claims, 8 Drawing Sheets

(56) References Cited

U.S. PATENT DOCUMENTS

2017/0284062 A1* 10/2017 Osaka .................. B60L 3/0046
2018/0245310 A1*  8/2018 Kumagai ................ E02F 3/32
2018/0320338 A1* 11/2018 Osaka ................ H01M 10/633
2021/0062467 A1   3/2021 Watanabe et al.
2021/0062471 A1   3/2021 Kaneda et al.

FOREIGN PATENT DOCUMENTS

| | | |
|---|---|---|
| EP | 2527540 | 11/2012 |
| EP | 2540915 | 1/2013 |
| JP | 2004-169466 | 6/2004 |
| JP | 2013-019181 | 1/2013 |
| JP | 5172898 | 3/2013 |
| JP | 2014-237943 | 12/2014 |
| JP | 2019-056236 | 4/2019 |
| JP | 2019-190107 | 10/2019 |
| JP | 2020-45709 | 3/2020 |
| WO | 2020059164 | 3/2020 |

* cited by examiner

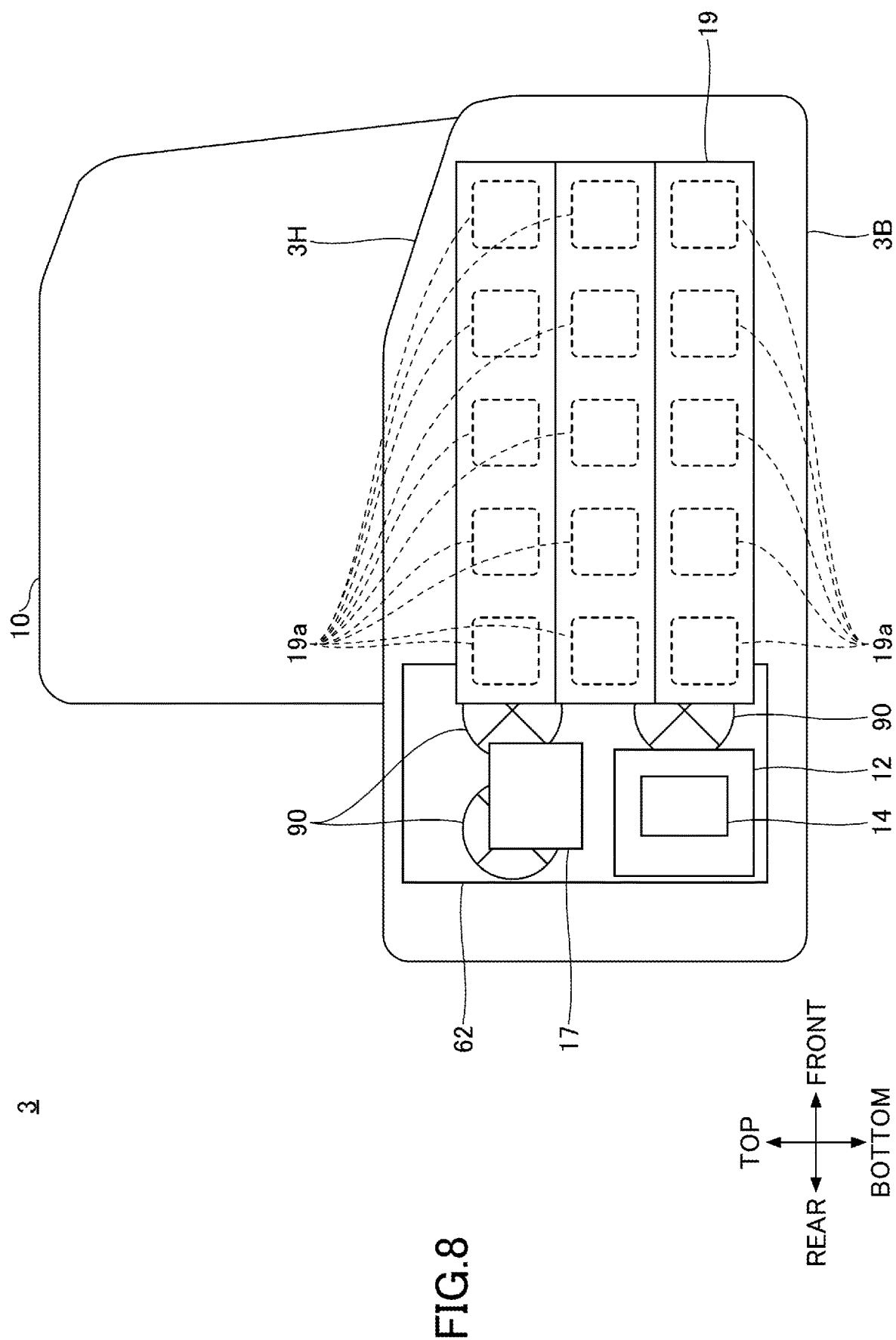

EXCAVATOR

CROSS-REFERENCE TO RELATED APPLICATIONS

The present application claims priority under 35 U.S.C. § 119 to Japanese Patent Application No. 2020-188896, filed on Nov. 12, 2020, the entire contents of which are incorporated herein by reference.

BACKGROUND OF THE INVENTION

1. Technical Field

The present disclosure relates to an excavator.

2. Description of the Related Art

For example, electric excavators that drive an actuator by using electric power of a power storage device such as a battery is known.

In the related art, air is introduced from outside by using a cooling fan to generate cooling air that takes heat from an internal device including a battery to discharge the heat to the outside.

SUMMARY OF THE INVENTION

However, in the related art, the air introduced from the outside of the excavator passes around the battery and then passes around other devices such as an oil cooler and a heat exchanger in the machine room. Therefore, the cooling air that has passed around the battery has a relatively high temperature by taking heat from the battery, and may not be able to cool other devices appropriately.

On the other hand, if a configuration is employed in which cooling air passes around other devices before passing around the power storage device such as a battery, the temperature of the power storage device may not able to be lowered appropriately due to the relatively high temperature air, which has taken the heat from other devices, reaching the power storage device.

In consideration of the above, an object of the present disclosure is to provide a technology capable of appropriately cooling multiple devices including the power storage in an electric excavator.

In order to achieve the above objectives, in one embodiment of the present disclosure, there is provided an excavator including a lower traveling body, an upper turning body turnably mounted on the lower traveling body, actuators configured to drive a driven portion including the lower traveling body and the upper turning body, a power storage mounted on the upper turning body and used as an energy source for driving the actuators, a cooling circuit configured to cool the power storage, and a fan mounted on the upper turning body and configured to blow air to a predetermined device for cooling the predetermined device. The power storage is arranged such that the power storage is apart from a path in which air outside the upper turning body, by an operation of the fan, is introduced into inside the upper turning body, passes across the predetermined device, and is discharged to the outside of the upper turning body.

Further, in another embodiment of the present disclosure, there is provided an excavator including a lower traveling body, an upper turning body turnably mounted on the lower traveling body, actuators that drives a driven portion including the lower traveling body and the upper turning body, a power storage mounted on the upper turning body and used as an energy source for driving the actuators, a cooling circuit that cools the power storage, and a fan mounted on the upper turning body that blows air to a predetermined device for cooling the predetermined device. The power storage is mounted on a front right portion of the upper turning body.

Further, in yet another embodiment of the present disclosure, there is provided an excavator including a lower traveling body, an upper turning body turnably mounted on the lower traveling body, actuators that drives a driven portion including the lower traveling body and the upper turning body, a power storage mounted on the upper turning body and used as an energy source for driving the actuators, a cooling circuit that cools the power storage, a fan mounted on the upper turning body that blows air to a predetermined device for cooling the predetermined device, and a flow changing member for changing a direction of flow of air that has passed across the predetermined device so as not to reach the power storage by an operation of the fan.

According to the above-described embodiments, in the electric excavator, multiple devices including the power storage can be appropriately cooled.

BRIEF DESCRIPTION OF THE DRAWINGS

FIG. 8 is a right side view illustrating another example of the arrangement of various devices of the upper turning body.

DESCRIPTION OF THE PREFERRED EMBODIMENTS

Hereinafter, embodiments will be described with reference to the drawings.

[Overview of Excavator]

First, an overview of an excavator 100 as an example of a working machine will be described with reference to FIG. 1.

Figure 1:
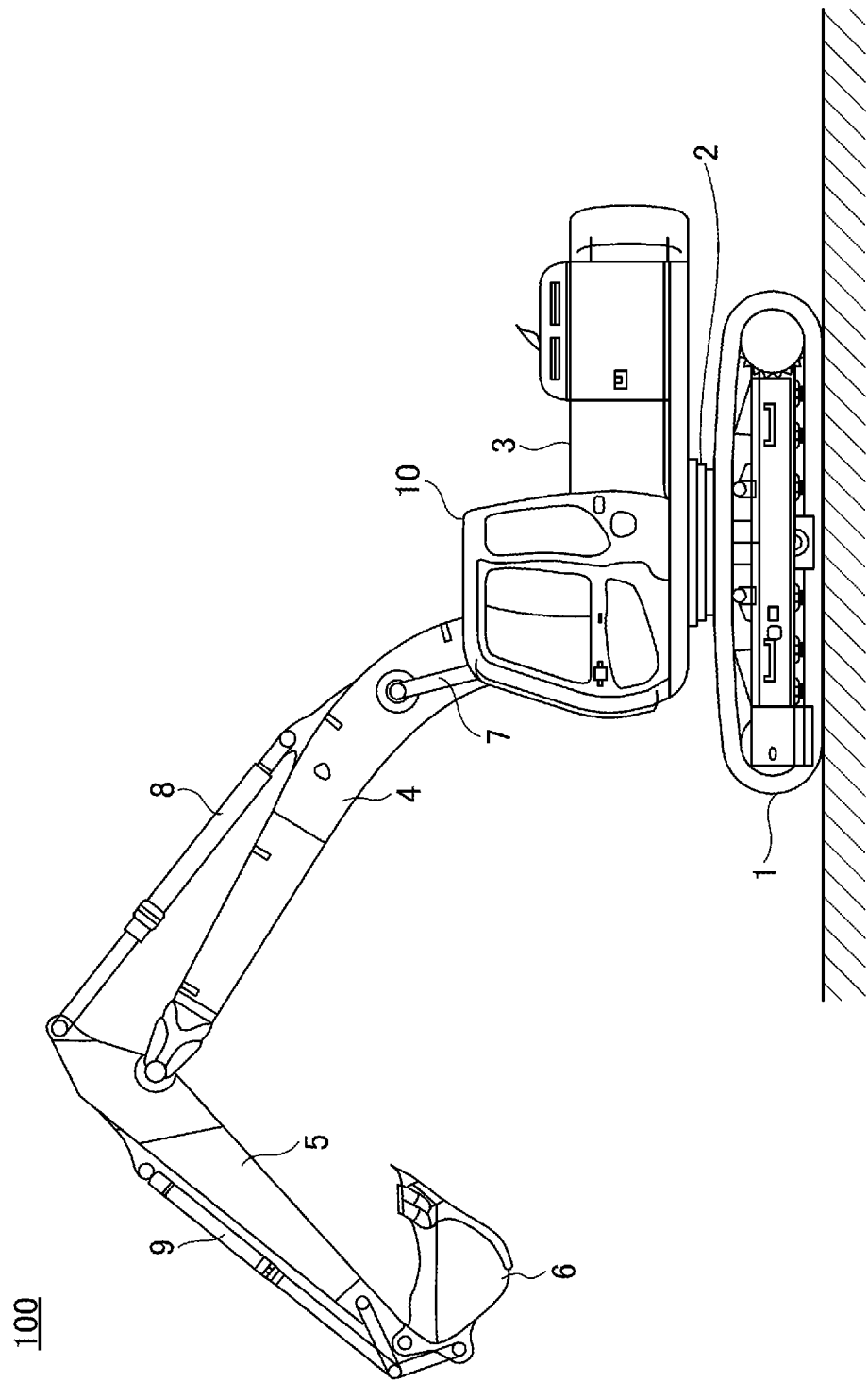
FIG. 1 is a side view of an excavator.

FIG. 1 is a side view illustrating an example of an excavator 100 according to the present embodiment.

The excavator 100 includes a lower traveling body 1; an upper turning body 3 which is mounted on the lower traveling body 1 in a turnable manner through a turning mechanism 2; a boom 4, an arm 5, and a bucket 6 as attachments; and a cabin 10 in which an operator is seated.

The lower traveling body 1 (an example of a driven portion) includes, for example, a pair of crawlers on the left and right, and each crawler is hydraulically driven by traveling hydraulic motors 1A and 1B (an example of an actuator) (see FIG. 2), so as to be self-propelling.

The upper turning body 3 (an example of a driven portion) is electrically driven by a turning motor 21 (an example of an actuator) (see FIG. 2) which will be described later through the turning mechanism 2, so that the upper turning body 3 turns relative to the lower traveling body 1. The upper turning body 3 may be hydraulically driven by a turning hydraulic motor instead of the turning motor 21 through the turning mechanism 2. In this case, the excavator 100 corresponds to a configuration in which all of the driven elements are hydraulically driven by hydraulic oil supplied from a main pump 14 (see FIG. 2) which is powered by an engine, and the power source (engine) of the hydraulic excavator is replaced by a pump motor 12.

The boom 4 (an example of a driven portion) is pivotally attached to the front center of the upper turning body 3 so as to be elevated, the arm 5 (an example of a driven portion) is pivotally attached to the leading end of the boom 4 so as to turn upward and downward, and the bucket 6 (an example of a driven portion) is pivotally attached to the leading end of the arm 5 so as to turn upward and downward. The boom 4, the arm 5, and the bucket 6 are hydraulically driven by a boom cylinder 7, an arm cylinder 8, and a bucket cylinder 9 (all of which are examples of actuators), respectively, as hydraulic actuators.

The bucket 6 is an example of an end attachment, and other end attachments may be attached to the end of the arm 5 instead of the bucket 6, according to the work content and the like. Other end attachments may be, for example, buckets of a type different from the bucket 6, such as a slope bucket or a dredging bucket, and the like. Other end attachments may also be, for example, end attachments of a type different from the bucket such as a breaker, an agitator, a grapple, or the like. Further, an auxiliary attachment such as a quick coupling or a tilt rotator may be provided at the attachment portion between the arm 5 and the end attachment including the bucket 6.

The cabin 10 is mounted on the front left side of the upper turning body 3, and an operator seat on which the operator is to be seated and an operation device 26, which will be described later, are provided inside (in the interior of) the cabin.

The excavator 100 operates driven elements such as the lower traveling body 1 (left and right crawlers), the upper turning body 3, the boom 4, the arm 5, and the bucket 6 according to the operation of the operator seating in the cabin 10.

Further, the excavator 100 may be configured to be operable by the operator seating in the cabin 10, or additionally, may be configured to be remotely controlled (remote control) from the outside of the excavator 100. When the excavator 100 is remotely controlled, the inside of the cabin 10 may be unmanned. Hereinafter, the description will proceed on the assumption that the operation of the operator includes at least one of an operation of the operator in the cabin 10 with respect to the operation device 26 or remote control of the external operator.

The remote control includes, for example, a mode in which the excavator 100 is operated by an operation input related to the actuator of the excavator 100 performed by a predetermined external device. In this case, the excavator 100 is equipped with a communication device capable of communicating with the predetermined external device. For example, image information (captured image) output by an image capture device included in a surrounding information acquisition device 40 (will be described later) may be transmitted to the external device. Subsequently, the external device may display the image information (captured image) received by a display device (hereinafter, "remote control display device") provided in the external device. Further, various information images (information screens) displayed on an output device 50 (display device) inside the cabin 10 of the excavator 100 may be similarly displayed on the remote control display device of the external device. This allows, for example, an operator of the external device to remotely control the excavator 100 while checking displayed contents such as an information screen or a captured image illustrating the surroundings of the excavator 100 displayed on the remote control display device. Subsequently, the excavator 100, according to a remote control signal that represents the content of the remote control received from the external device by the communication device, may operate an actuator to drive a driven element such as the lower traveling body 1, the upper turning body 3, the boom 4, the are 5, and the bucket 6.

Further, the remote control may include a mode in which the excavator 100 is operated by, for example, an external voice input or a gesture input to the excavator 100 by a person (for example, a worker) around the excavator 100. Specifically, the excavator 100 recognizes, through a voice input device (for example, a microphone), a gesture input device (for example, an image capture device), or the like mounted on the excavator 100 (machine in question), a speech uttered by a surrounding worker for example, a gesture performed a worker for example, or the like. Subsequently, the excavator 100 may operate the actuator according to the recognized speech, gesture, or the like to drive driven elements such as the lower traveling body, the upper turning body 3, the boom 4, the are 5, and the bucket 6.

Further, the excavator 100 may automatically operate the actuator regardless of the content of the operation of the operator. This allows the excavator 100 to implement a function of automatically operating at least a part of driven elements such as the lower traveling body 1, the upper turning body 3, the boom 4, the are 5, and the bucket 6 (what is referred to as "automatic operation function" or "Machine Control (MC) function").

The automatic operation function may include a function of automatically operating a driven element (actuator) other than the driven element (actuator) to be operated (what is referred to as "semi-automatic operation function" or "operation assist type MC function"), according to the operation with respect to the operation device 26 or remote control by the operator. Further, the automatic operation function may include a function of automatically operating at least a part of multiple driven elements (actuators) (what is referred to as "fully automatic operation function" or "fully automatic MC function") assuming that there is no operation with respect to the operation device 26 or remote control by the operator. When the fully automatic operation function is enabled in the excavator 100, the inside of the cabin 10 may be unmanned. Further, the semi-automatic operation function, the fully automatic operation function, or the like may include a mode in which the operation content of the driven element (actuator) to be automatically operated is automatically determined according to a predetermined rule. Further, the semi-automatic operation function, the fully automatic operation function, or the like may include a mode in which the excavator 100 autonomously makes various determinations and the operation content of the driven element (actuator) to be automatically operated is autonomously determined according to the determinations (what is referred to as "autonomous operation function").

[Configuration of Excavator]

Next, the configuration of the excavator 100 according to the present embodiment will be described with reference to FIG. 2 to FIG. 4 in addition to FIG. 1.

Figure 2:
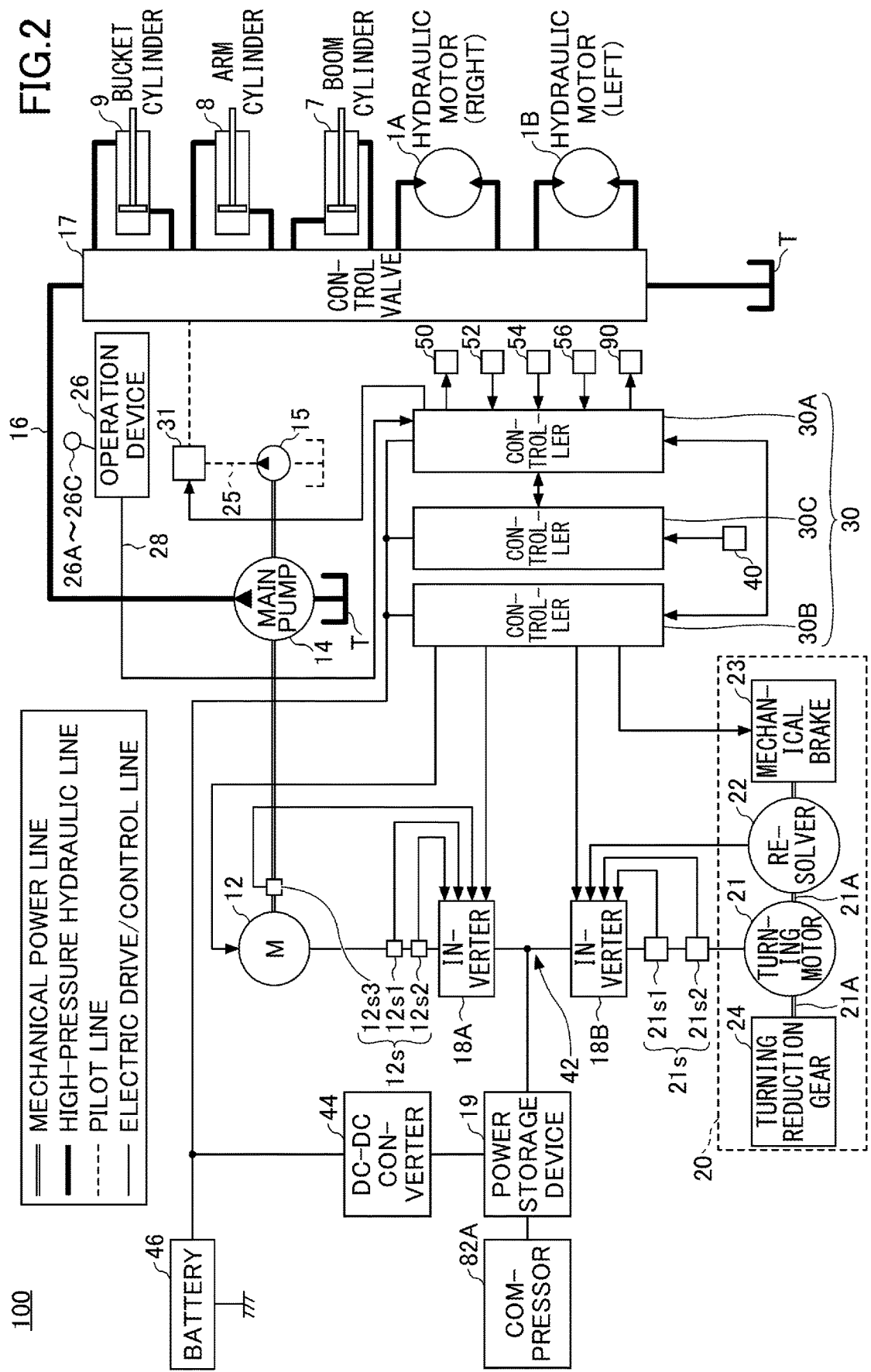
FIG. 2 is a diagram schematically illustrating an example of a configuration of the excavator.

FIG. 2 is a diagram schematically illustrating an example of a configuration of the excavator 100 according to the present embodiment. FIG. 3 is a diagram schematically illustrating an example of a cooling circuit 60 for an electric driving system mounted on the excavator 100 according to the present embodiment. FIG. 4 is a diagram illustrating an example of a heat pump cycle 82 of an air conditioning device 80 mounted on the excavator 100 according to the present embodiment.

In FIG. 2, the mechanical power line is illustrated by a double line, the high-pressure hydraulic line is illustrated by a thick solid line, the pilot line is illustrated by a dashed line, and the electric drive/control line is illustrated by a thin solid line.

<Hydraulic Driving System>

The hydraulic driving system of the excavator 100 includes hydraulic actuators such as the traveling hydraulic motors 1A and 1B, the boom cylinder 7, the arm cylinder 8, and the bucket cylinder 9 for hydraulically driving each driven element such as the lower traveling body 1, the boom 4, the arm 5, and the bucket 6. Further, the hydraulic driving system of the excavator 100 includes the pump motor 12, the main pump 14, and a control valve 17.

The pump motor 12 (an example of an electric motor) is a power source for the hydraulic driving system. The pump motor 12 is, for example, an IPM (Interior Permanent Magnet) motor. The pump motor 12 is connected to a high voltage power supply including a power storage device 19 and to the turning motor 21, via an inverter 18A. The pump motor 12 performs a power running operation by three-phase AC power supplied from the power storage device 19 and the turning motor 21 via the inverter 18A to drive the main pump 14 and a pilot pump 15. The drive control of the pump motor 12 may be performed by the inverter 18A under the control of a controller 30B, which will be described later.

The main pump 14 (an example of a hydraulic pump) sucks in the hydraulic oil from a hydraulic oil tank T and discharges the hydraulic oil to a high pressure hydraulic line 16 to supply hydraulic oil to the control valve 17 through the high pressure hydraulic line 16. The main pump 14 is driven by the pump motor 12. The main pump 14 is, for example, a variable displacement hydraulic pump, and a regulator (not illustrated) controls the angle (tilt angle) of the swash plate under the control of the controller 30A, which will be described later. Accordingly, the main pump 14 can adjust the stroke length of the piston and control the discharge flow rate (discharge pressure).

The control valve 17 controls the hydraulic driving system according to the operation of the operator or an operation instruction corresponding to the automatic operation function. As described above, the control valve 17 is connected to the main pump 14 through the high pressure hydraulic line 16 and is configured to selectively supply hydraulic oil supplied from the main pump 14 to hydraulic actuators. For example, the control valve 17 is a valve unit that includes a plurality of control valves (directional changeover valves) for controlling the flow rate and flow direction of hydraulic oil supplied from the main pump 14 to each of the hydraulic actuators. The hydraulic oil supplied from the main pump 14 and flowing through the control valve 17 or the hydraulic actuator is discharged from the control valve 17 to the hydraulic oil tank T.

<Electric Driving System>

The electric driving system of the excavator 100 includes the pump motor 12, a sensor 12s, and the inverter 18A. Further, the electric driving system of the excavator 100 also includes a turning driving device 20, a sensor 21s, and an inverter 18B. Further, the electric driving system of the excavator 100 includes the high voltage power supply including the power storage device 19 or the like.

The sensor 12s includes a current sensor 12s1, a voltage sensor 12s2, and a rotation state sensor 12s3.

The current sensor 12s1 detects the current of each of the three phases (U phase, V phase, and W phase) of the pump motor 12. The current sensor 12s1 is provided, for example, in a power path between the pump motor 12 and the inverter 18A. The detection signal corresponding to the current of each of the three phases of the pump motor 12 detected by the current sensor 12s1 is directly entered into the inverter 18A through a communication line. Alternatively, the detection signal may be entered into the controller 30B through a communication line and input to the inverter 18A through the controller 30B.

The voltage sensor 12s2 detects the applied voltage of each of the three phases of the pump motor 12. The voltage sensor 12s2 is provided, for example, in the power path between the pump motor 12 and the inverter 18A. The detection signal corresponding to the applied voltage of each of the three phases of the pump motor 12 detected by the voltage sensor 12s2 is directly entered into the inverter 18A through a communication line. Alternatively, the detection signal may be entered into the controller 30B through a communication line and input to the inverter 18A through the controller 30B.

The rotation state sensor 12s3 detects the rotation state of the pump motor 12. The rotation state of the pump motor 12 includes, for example, rotation position (rotation angle), rotation speed, and the like. The rotation state sensor 12s3 is, for example, a rotary encoder or a resolver. The detection signal corresponding to the rotation state of the pump motor 12 detected by the rotation state sensor 12s3 is directly entered into the inverter 18A through a communication line. Further, the detection signal may be entered into the controller 30B through the communication line and input to the inverter 18A through the controller 30B.

The inverter 18A drives and controls the pump motor 12 under the control of the controller 30B. The inverter 18A includes, for example, a conversion circuit that converts DC power to three-phase AC power or converts three-phase AC power to DC power, a driving circuit that drives and switches the conversion circuit, and a control circuit that outputs a control signal to define the operation of the driving circuit. For example, the control signal is a Pulse Width Modulation (PWM) signal.

The control circuit of the inverter 18A performs drive control of the pump motor 12 while identifying the operation state of the pump motor 12. For example, the control circuit of the inverter 18A identifies the operation state of the pump motor 12 based on the detection signal of the rotation state sensor 12s3. The control circuit of the inverter 18A may identify the operation state of the pump motor 12 by sequentially estimating the rotation angle of the rotational shaft of the pump motor 12 or the like based on the detection signal of the current sensor 12s1 and the detection signal of the voltage sensor 12s2 (or the voltage instruction value generated in the control process).

Note that at least one of the driving circuit and the control circuit of the inverter 18A may be provided external to the inverter 18A.

The turning driving device 20 includes the turning motor 21, a resolver 22, a mechanical brake 23, and a turning reduction gear 24.

Under the control of the controller 30B and the inverter 18B, the turning motor 21 performs a power running operation to drive the turning of the upper turning body 3, and a regenerative operation to generate regenerative power to brake while turning the upper turning body 3. The turning motor 21 is connected to the high voltage power supply (i.e., the power storage device 19) via the inverter 18B and is driven by three-phase AC power supplied from the power storage device 19 via the inverter 18B. The turning motor 21 supplies regenerative power to the power storage device 19 or the pump motor 12 through the inverter 18B. Accordingly, the power storage device 19 can be charged or the pump motor 12 can be driven by regenerative power. Control for switching between the power running operation and the regenerative operation of the turning motor 21 may be performed by the inverter 18B under the control of the controller 30B. The resolver 22, the mechanical brake 23, and the turning reduction gear 24 are connected to a rotational shaft 21A of the turning motor 21.

The resolver 22 detects the rotation state of the turning motor 21. The rotation state of the turning motor 21 includes, for example, rotation position (rotation angle), rotation speed, and the like. The detection signal corresponding to the rotation angle or the like detected by the resolver 22 may be directly entered into the inverter 18B through a communication line. Alternatively, the detection signal may be entered into the controller 30B through a communication line and input to the inverter 18B through the controller 30B.

The mechanical brake 23 mechanically generates a braking force with respect to the rotational shaft 21A of the turning motor 21 under the control of the controller 30B. Accordingly, the mechanical brake 23 can brake while turning the upper turning body 3 or maintain the stopped state of the upper turning body 3.

The turning reduction gear 24 is connected to the rotational shaft 21A of the turning motor 21, and by decelerating the output (torque) of the turning motor 21 by a predetermined deceleration ratio, the torque is increased to drive the turning of the upper turning body 3. That is, during the power running operation, the turning motor 21 drives the turning of the upper turning body 3 via the turning reduction gear 24. Further, the turning reduction gear 24 increases the inertial rotation force of the upper turning body 3 and transmits the increased inertial rotation force to the turning motor 21 to generate regenerative power. That is, during the regenerative operation, the turning motor 21 generates regenerative power by the inertial rotation force of the upper turning body 3 transmitted via the turning reduction gear 24, and turns and brakes the upper turning body 3.

The sensor 21s includes a current sensor 21s1 and a voltage sensor 21s2.

The current sensor 21s1 detects the current of each of the three phases (U phase, V phase, and W phase) of the turning motor 21. The current sensor 21s1 is provided, for example, in a power path between the turning motor 21 and the inverter 18B. The detection signal corresponding to the current of each of the three phases of the turning motor 21 detected by the current sensor 21s1 may be directly entered into the inverter 18B through a communication line. Alternatively, the detection signal may be entered into the controller 30B via a communication line and input to the inverter 18B via the controller 30B.

The voltage sensor 21s2 detects the applied voltage of each of the three phases of the turning motor 21. The voltage sensor 21s2 is provided, for example, in the power path between the turning motor 21 and the inverter 18B. The detection signal corresponding to the applied voltage of each of the three phases of the turning motor 21 detected by the voltage sensor 21s2 is directly entered into the inverter 18B through a communication line. Alternatively, the detection signal may be entered into the controller 30B via a communication line and input to the inverter 18B via the controller 30B.

The inverter 18B drives and controls the turning motor 21 under the control of the controller 30B. The inverter 18B includes, for example, a conversion circuit for converting DC power to three-phase AC power or for converting three-phase AC power to DC power, a driving circuit that drives and switches the conversion circuit, and a control circuit for outputting a control signal (for example, a PWM signal) for defining the operation of the driving circuit.

For example, the control circuit of the inverter 18B provides speed feedback control and torque feedback control relating to the turning motor 21 based on the detection signals of the current sensor 21s1, the voltage sensor 21s2, and the resolver 22.

Figure 3:
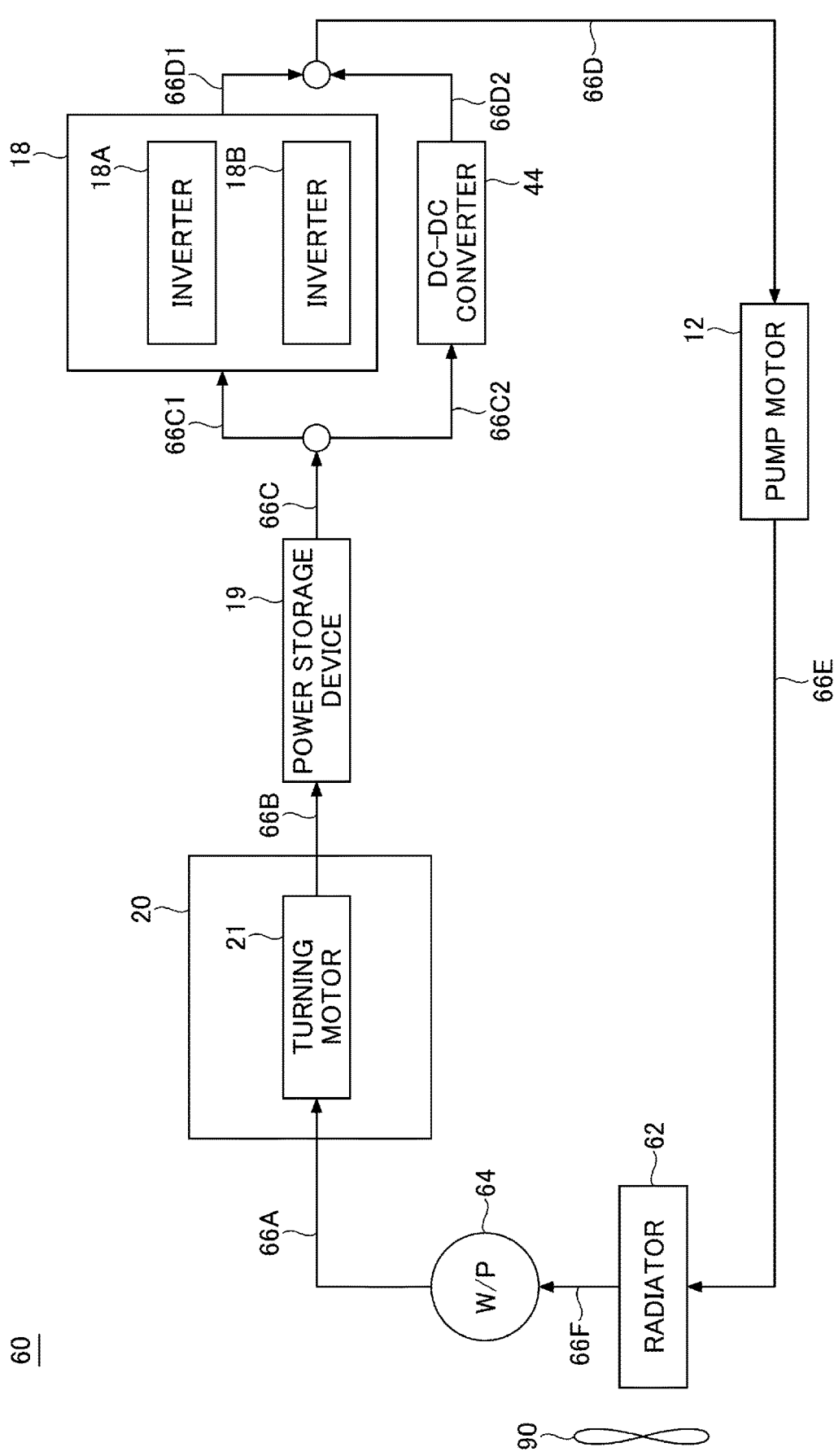
FIG. 3 is a diagram schematically illustrating an example of a configuration of a cooling device for an electric driving system.

For example, as illustrated in FIG. 3, the inverters 18A and 18B may be housed in one housing to integrally form an inverter unit 18.

Note that at least one of the driving circuit and the control circuit of the inverter 18B may be provided external to the inverter 18B.

The power storage device 19 is an energy source for driving the actuator of the excavator 100. The power storage device 19 is charged (power is stored) by being connected to an external commercial power supply by a predetermined cable, and the charged (stored) power is supplied to the pump motor 12 or the turning motor 21 through a Direct Current (DC) bus 42. The power storage device 19 charges the generated power (regenerative power) of the turning motor 21. The power storage device 19 is, for example, a lithium ion battery and has a relatively high output voltage (e.g., several hundred volts).

A power conversion device for boosting the output voltage of the power storage device 19 to apply to the pump motor 12 or the turning motor 21 may be provided between the power storage device 19 and the DC bus 42. In this case, the power conversion device raises the voltage (step-up) of the power of the power storage device 19, lowers the voltage (step-down) of the generated power (regenerative power) from the pump motor 12 or the turning motor 21 via the inverters 18A and 18B, and stores the power in the power storage device 19. The power conversion device may switch between a step-up operation and a step-down operation so that the voltage value of the DC bus 42 is within a constant range, according to the operation state of the pump motor 12 and the turning motor 21. Switching control between the step-up operation and the step-down operation of the power conversion device may be performed by the controller 30B based on, for example, a voltage detection value of the DC bus 42, a voltage detection value of the power storage device 19, and a current detection value of the power storage device 19.

<Operation System>

The operation system of the excavator 100 includes the pilot pump 15, the operation device 26, and a pressure control valve 31.

The pilot pump 15 supplies, via a pilot line 25, pilot pressure to various hydraulic devices (for example, the pressure control valve 31) installed in the excavator 100. Accordingly, the pressure control valve 31 can supply a pilot pressure to the control valve 17 according to the operation content (for example, the operation amount or the operation direction) with respect to the operation device 26, under the control of the controller 30A. Therefore, the controller 30A and the pressure control valve 31 can implement the operation of the driven element (hydraulic actuator) according to the operation content of the operator with respect to the operation device 26. Further, the pressure control valve 31 can supply the pilot pressure to the control valve 17 according to the content of the remote control specified by the remote control signal under the control of the controller 30A. The pilot pump 15 is, for example, a fixed displacement hydraulic pump, and is driven by the pump motor 12 as described above.

The pilot pump 15 may be omitted. In this case, various hydraulic devices such as the pressure control valve 31 may be supplied with hydraulic oil which is discharged from the main pump 14 and reduced to a predetermined pilot pressure via a pressure reduction valve or the like.

The operation device 26 is positioned within reach of an operator seated on the operator seat in the cabin 10 and is used by the operator to operate the respective driven elements (i.e., the left and right crawlers of the lower traveling body 1, the upper turning body 3, the boom 4, the arm 5, the bucket 6, and the like). That is, the operator uses the operation device 26 to operate hydraulic actuators (for example, the traveling hydraulic motors 1A and 1B, the boom cylinder 7, the arm cylinder 8, the bucket cylinder 9, and the like) and electric actuators (the turning motor 21, and the like) that drive the respective driven elements. The operation device 26 is, for example, electric and outputs an electric signal (hereinafter, an "operation signal") according to the operation content by the operator. The operation signal output from the operation device 26 is entered into the controller 30A. Accordingly, the control device 30 including the controller 30A can control the pressure control valve 31 and the inverter 18B, and the driven element (actuator) of the excavator 100 can be controlled according to the operation content of the operator or the operation instruction corresponding to the automatic operation function.

The operation device 26 includes, for example, levers 26A to 26C. The lever 26A, for example, may be configured to be able to accept the operation related to each of the arm 5 (the arm cylinder 8) and the upper turning body 3 (turning operation) according to the forward or backward operation and rightward or leftward operation. The lever 26B, for example, may be configured to be able to accept the operation related to the boom 4 (the boom cylinder 7) and the bucket 6 (the bucket cylinder 9) according to the forward or backward operation and rightward or leftward operation. The lever 26C, for example, may be configured to be able to accept the operation of the lower traveling body 1 (the crawler).

When the control valve 17 is configured by a solenoid (electromagnetic) pilot-type hydraulic control valve (directional change-over valve), the operation signal of the operation device 26, e.g. electric type operation device, may be directly input to the control valve 17 and the respective hydraulic control valves may operate according to the operation content with respect to the operation device 26. Further, the operation device 26 may be a hydraulic pilot-type that outputs a pilot pressure according to the operation content. In this case, the pilot pressure according to the operation content is supplied to the control valve 17.

The pressure control valve 31 uses hydraulic oil supplied from the pilot pump 15 through the pilot line 25 to output predetermined pilot pressure, under the control of the controller 30A. The pilot line on the secondary side of the pressure control valve 31 is connected to the control valve 17, and the pilot pressure output from the pressure control valve 31 is supplied to the control valve 17.

<Control System>

The control system of the excavator 100 includes the control device 30, the surrounding information acquisition device 40, the output device 50, an input device 52, a temperature sensor 54, and an oil temperature sensor 56.

The control device 30 includes controllers 30A to 30C.

The functions of the controllers 30A to 30C may each be implemented by any piece of hardware or a combination of any hardware and software. For example, the controllers 30A to 30C may each be configured around a computer including a processor such as a CPU (Central Processing Unit), a memory device (main storage device) such as RAM (Random Access Memory), a non-volatile auxiliary storage device such as ROM (Read Only Memory), and an interface device with respect to external elements.

The controller 30A cooperates with various controllers configuring the control device 30 including the controllers 30B and 30C to perform driving control of the excavator 100.

For example, the controller 30A outputs a control instruction to the pressure control valve 31 according to an operation signal input from the operation device 26 and outputs pilot pressure from the pressure control valve 31 according to the operation content with respect to the operation device 26. Accordingly, the controller 30A can implement the operation of the driven element (hydraulic actuator) of the excavator 100 corresponding to the operation content with respect to the operation device 26 of an electric type.

Further, when the excavator 100 is remotely controlled, the controller 30A, for example, may perform control related to the remote control. Specifically, the controller 30A may output a control instruction to the pressure control valve 31 and output pilot pressure according to the content of the remote control from the pressure control valve 31. Accordingly, the controller 30A can implement the operation of the excavator 100 (the driven element) corresponding to the operation content with respect to the remote control.

Further, the controller 30A, for example, may control the automatic operation function. Specifically, the controller 30A may output a control instruction to the pressure control valve 31 and apply a pilot pressure corresponding to an operation instruction corresponding to the automatic operation function from the pressure control valve 31 to the control valve 17. Accordingly, the controller 30A can implement the operation of the driven element (hydraulic actuator) of the excavator 100 corresponding to the operation content with respect to the automatic operation function.

For example, the controller 30A may comprehensively control the operation of the entire excavator 100 (various devices installed in the excavator 100) based on bidirectional communication with various controllers such as the controllers 30B and 30C.

Further, the controller 30A may control, for example, a function of automatically stopping the main pump 14 (hereinafter, "pump stop function").

Specifically, the controller 30A may automatically stop the main pump 14 in a case in which the excavator 100 is in a state of continuously not being operated (operation with respect to the operation device 26 or remote control) by the operator. As a result, the controller 30A can stop the main pump 14 of the excavator 100, that is, the pump motor 12, which is not needed when the excavator is not operated. Accordingly, the consumption of the power in the power storage device 19 by the pump motor 12 can be reduced. Further, the controller 30A may stop the main pump 14 when a predetermined input indicating an intention to stop the main pump 14 is received through the input device 52 while the excavator 100 is driving (in operation). As a result, the controller 30A can stop the main pump (pump motor 12) by reflecting the intention of the operator. Therefore, for example, the operator may make a predetermined input through the input device 52 in a situation where the operating noise of the main pump 14 (pump motor 12) in operation interferes with communication with surrounding workers. Accordingly, the operating noise can be temporarily reduced, and communication with surrounding workers can be achieved.

For example, the control device 30 (the controllers 30A and 30B) activates the main pump 14, i.e., the pump motor 12 when the excavator 100 is activated (for example, when the key switch is turned on), regardless of whether the operation device 26 is operated. This allows the control device 30 to activate the pump motor 12 once at the time of the activation of the excavator 100 to shift the pump motor 12 to a controllable state. When the excavator 100 is activated, the control device 30 can activate the pump motor 12 once and perform a process of diagnosing the presence or absence of an abnormality in the pump motor 12 and the like. For example, the controller 30B energizes the pump motor 12 through the inverter 18A to diagnose the presence or absence of an abnormality. The controller 30B may notify an operator of an abnormality in the pump motor 12 through the output device 50 or the like when there is an abnormality. Conversely, when there is no abnormality in the pump motor 12 and the operation with respect to operation device 26 is not started subsequently, the controller 30B may stop the pump motor 12 by means of a pump stop function. Further, the controller 30A may automatically start the pump motor 12 when the operation of the operator is started. Then, every time the continuation of the non-operating state is detected, the pump motor 12 may be automatically stopped, and when the operation of the operator is started, the process of automatically starting the pump motor 12 may be repeated.

Further, the controller 30A may control, for example, the start and stop of the operation of a fan 90.

The controller 30B performs drive control of the electric driving system based on various kinds of information (for example, a control instruction including an operation signal of the operation device 26) input from the controller 30A.

For example, the controller 30B may drive the inverter 18B based on the operation content with respect to the operation device 26 to perform switching control of the operation state (power running operation and regenerative operation) of the turning motor 21. Further, for example, when the excavator 100 is remotely controlled, the controller 30B may drive the inverter 18B based on the content of the remote control to perform switching control of the operation state (power running operation and regenerative operation) of the turning motor 21. Further, for example, when the automatic operation function of the excavator 100 is enabled, the controller 30B may drive the inverter 18B based on the operation instruction corresponding to the automatic operation function to perform switching control of the operation state (power running operation and regenerative operation) of the turning motor 21.

The above-mentioned power conversion device may be provided between the power storage device 19 and the DC bus 42. In this case, for example, the controller 30B may drive the power conversion device based on the operation state of the operation device 26 to perform switching control between a step-up operation and a step-down operation of the power conversion device, that is, between the discharging state and the charging state of the power storage device 19. Further, for example, when the excavator 100 is remotely controlled, the controller 30B may drive the power conversion device based on the content of the remote control to perform switching control between the discharging state and the charging state of the power storage device 19. Further, for example, when the automatic operation function of the excavator 100 is enabled, the controller 30B may drive the power conversion device based on the operation instruction corresponding to the automatic operation function to perform switching control between the discharging state and the charging state of the power storage device 19.

Further, the controller 30B may control the stop and start of the pump motor 12 according to a control instruction from the controller 30A relating to the pump stop function.

The controller 30C controls a surrounding monitoring function of the excavator 100.

For example, the controller 30C detects a predetermined object (hereinafter, "monitor target object") around the excavator 100 and the position of the predetermined object based on data relating to the status of the three-dimensional space around the excavator 100 entered from the surrounding information acquisition device 40. The data relating to the status of the three-dimensional space around the excavator 100 includes, for example, detection data relating to an object around the excavator 100 or the position of the object.

Further, for example, the controller 30C may output an alarm through the output device 50 (for example, a display device or a voice sound output device) in the interior of the cabin 10 when a monitor target object is detected in a region that is relatively close to the excavator 100.

The functions of the controllers 30B and 30C may be integrated into the controller 30A. That is, the various functions implemented by the control device 30 may be implemented by one controller or may be implemented by being distributed over two or more controllers set as appropriate.

The surrounding information acquisition device 40 outputs information relating to the status of the three-dimensional space around the excavator 100. The surrounding information acquisition device 40 may include, for example, an ultrasonic sensor, a millimeter wave radar, a monocular camera, a stereo camera, a depth camera, a Light Detection and Ranging (LIDAR), a distance image sensor, an infrared sensor, and the like. The output information of the surrounding information acquisition device 40 is entered into the controller 30C.

The output device 50 is provided in the cabin 10 and outputs various information to the operator under the control of the control device (for example, the controller 30A). The output device 50 includes, for example, a display device that outputs (notifies) information to the operator by a visual method. The output device 50 may be disposed in a location within the cabin 10 that is easily visible from the operator's position, and display various information images under the control of the controller 30A. The display device is, for example, a liquid crystal display or an organic electroluminescent (EL) display. Further, the output device 50 includes, for example, a sound output device that outputs information to the operator by an auditory method. The sound output device is, for example, a buzzer, a speaker, or the like.

The input device 52 is provided in the cabin 10 and accepts various inputs from the operator. The input device 52 may include, for example, an operation input device that accepts an operation input of the operator. The operation input device includes, for example, a button, a toggle, a lever, a touch panel, a touch pad, and the like. Further, the input device 52 may include, for example, a voice input device that accepts voice input from the operator and a gesture input device that accepts gesture input from the operator. The voice input device includes, for example, a microphone that acquires the voice of the operator in the cabin 10. Further, the gesture input device includes, for example, an indoor camera capable of capturing the state of the gesture of the operator in the cabin 10. A signal corresponding to the input from the operator accepted by the input device 52 is entered into the control device 30 (for example, the controller 30A).

The temperature sensor 54 detects the temperature of the electric driving system device to be cooled by the cooling circuit 60, which will be described later. The temperature sensor 54 includes, for example, a temperature sensor that detects the temperature of the pump motor 12. Further, the temperature sensor 54 includes a temperature sensor that detects the temperature of the inverter 18A. Further, the temperature sensor 54 includes a temperature sensor that detects the temperature of the inverter 18B. Further, the temperature sensor 54 includes, for example, a temperature sensor that detects the temperature of the power storage device 19. Further, the temperature sensor 54 includes, for example, a temperature sensor that detects the temperature of the turning motor 21. Further, the temperature sensor 54 includes, for example, a temperature sensor that detects the temperature of a DC-DC converter 44 which will be described later. A detection signal of the temperature sensor 54 is entered into, for example, the controller 30A. Accordingly, the controller 30A can identify the respective temperature state of the electric driving system devices.

When the power conversion device is provided between the power storage device 19 and the DC bus 42, the temperature sensor may include a temperature sensor that identifies the temperature state of the power conversion device.

The oil temperature sensor 56 detects the temperature of the hydraulic oil for driving the hydraulic actuator (hereinafter, "hydraulic oil temperature"). The oil temperature sensor 56 may detect, for example, the temperature of the hydraulic oil inside the hydraulic oil tank T. A detection signal of the oil temperature sensor 56 is entered into, for example, the controller 30A. Accordingly, the controller 30A can identify the temperature state of the hydraulic oil.

<Other Elements>

The excavator 100 according to the present embodiment includes the DC-DC converter 44, a battery 46, the cooling circuit 60, the air conditioning device 80, and the fan 90.

The DC-DC converter 44 is provided on, for example, the upper turning body 3 and steps down a very high voltage DC power output from the power storage device 19 to a predetermined voltage (for example, approximately 24 volts) and outputs the DC power. The output power of the DC-DC converter 44 is supplied to the battery 46 and charged (stored), or is supplied to an electric device driven by the power of the battery 46 such as the controllers 30A to 30C.

Note that the DC-DC converter 44 may be replaced with an alternator. In this case, the alternator may be provided on the upper turning body 3 and generate power by the power of the pump motor 12. As in the case of the DC-DC converter 44, the output power of the alternator is supplied to the battery 46 and charged (stored) in the battery 46, or is supplied to an electric device driven by the power of the battery 46 such as the controllers 30A to 30C.

The battery 46 is provided on the upper turning body 3 and has a relatively low output voltage (for example, 24 volts). The battery 46 supplies power to electric devices (for example, the controllers 30A to 30C, the air conditioning device 80, or the like) other than the electric driving system that requires relatively high power. The battery 46 is, for example, a lead-acid battery, a lithium ion battery, or the like and is charged with the output power of the DC-DC converter 44 as described above.

The cooling circuit 60 (an example of a cooling device) cools the device or the like of the electric driving system. For example, as illustrated in FIG. 3, the device to be cooled by the cooling circuit 60 includes the pump motor 12, the inverter unit 18, the power storage device 19, the turning driving device 20, the DC-DC converter 44, and the like.

The cooling circuit 60 includes a radiator 62, a water pump (W/P) 64, and refrigerant flow paths 66A, 66B, 66C, 66C1, 66C2, 66D, 66D1, 66D2, 66E, and 66F.

The radiator 62 (an example of a predetermined device) cools refrigerant (for example, cooling water) in the cooling circuit 60. Specifically, the radiator 62 cools the refrigerant by exchanging heat between the ambient air and the refrigerant.

The water pump 64 sucks in the refrigerant from the refrigerant flow path 66F and discharges the refrigerant to the refrigerant flow path 66A to circulate the refrigerant in the cooling circuit 60.

The refrigerant flow path 66A connects the water pump 64 to the turning driving device 20, and allows the refrigerant discharged from the water pump 64 to flow into the refrigerant flow path inside the turning driving device 20. Accordingly, the turning motor 21 and the like in the turning driving device 20 can be cooled by the refrigerant. The refrigerant that has passed through the inside of the turning driving device 20 flows out to the refrigerant flow path 66B.

The refrigerant flow path 66B connects the turning driving device 20 to the power storage device 19, and allows the refrigerant flowing out of the turning driving device 20 to flow into the refrigerant flow path inside the power storage device 19. Accordingly, the power storage device 19 can be cooled by the refrigerant. The refrigerant that has passed through the inside of power storage device 19 flows out to the refrigerant flow path 66C.

The refrigerant flow paths 66C, 66C1, and 66C2 connect the power storage device 19 to the inverter unit 18 and the DC-DC converter 44, and allow the refrigerant flowing out of the power storage device 19 to flow into the refrigerant flow path inside the inverter unit 18 and the DC-DC converter 44. Specifically, the refrigerant flow path 66C whose one end is connected to the power storage device 19 branches into the refrigerant flow paths 66C1 and 66C2 at the other end. The refrigerant flow paths 66C1 and 66C2 are connected to the inverter unit 18 and the DC-DC converter 44, respectively. As a result, the inverters 18A and 18B included in the inverter unit 18 and the DC-DC converter 44 can be cooled. The refrigerant that has passed through the inside of the inverter unit 18 flows out to the refrigerant flow path 66D1. The refrigerant that has passed through the inside of the DC-DC converter 44 flows out to the refrigerant flow path 66D2.

The refrigerant flow paths 66D, 66D1, and 66D2 connect the inverter unit 18 and the DC-DC converter 44 to the pump motor 12, and allow the refrigerant flowing out of the inverter unit 18 and the DC-DC converter 44 to flow into the refrigerant flow path inside the pump motor 12. Specifically, the refrigerant flow paths 66D1 and 66D2, one ends of which are connected to the inverter unit 18 and the DC-DC converter 44, respectively, merge with one end of the refrigerant flow path 66D. The other end of the refrigerant flow path 66D is connected to the pump motor 12. As a result, the pump motor 12 can be cooled by the refrigerant. The refrigerant that has passed through the inside of the pump motor 12 flows out to the refrigerant flow path 66E.

When the power conversion device is provided between the power storage device 19 and the DC bus 42, the power conversion device may be cooled by the cooling circuit 60. In this case, the power conversion device may be arranged in parallel with the inverter unit 18 and the DC-DC converter 44 in the cooling circuit 60, and may be cooled by the refrigerant flowing out of the power storage device 19. Further, the DC-DC converter 44 may be air-cooled. In this case, the refrigerant flow paths 66C2 and 66D2 are omitted. Further, at least a part of the inverters 18A and 18B, the DC-DC converter 44, and the like may be arranged in series in the cooling circuit 60.

The refrigerant flow path 66E connects the pump motor 12 to the radiator 62, and supplies the refrigerant flowing out of the pump motor 12 to the radiator 62. Accordingly, by cooling the various devices of the electric driving system, the refrigerant whose temperature has risen is cooled by the radiator, and the various devices of the electric drive system can be returned to a coolable state.

The refrigerant flow path 66F connects the radiator 62 to the water pump 64, and supplies the refrigerant cooled by the radiator 62 to the water pump 64. The water pump 64 can circulate the refrigerant cooled by the radiator 62 in the cooling circuit 60.

The air conditioning device 80 adjusts the temperature, humidity, and the like in the interior of the cabin 10. The air conditioning device 80 is driven by the electric power supplied from, for example, the DC-DC converter 44 or the battery 46. The air conditioning device 80 is, for example, a heat pump type for both cooling and heating, and includes a heat pump cycle 82.

The air conditioning device 80 may include, for example, a refrigeration cycle and a heater for heating instead of the heat pump cycle 82. The heater for heating is, for example, a Positive Temperature Coefficient (PTC) heater, a combustible heater, or the like.

Figure 4:
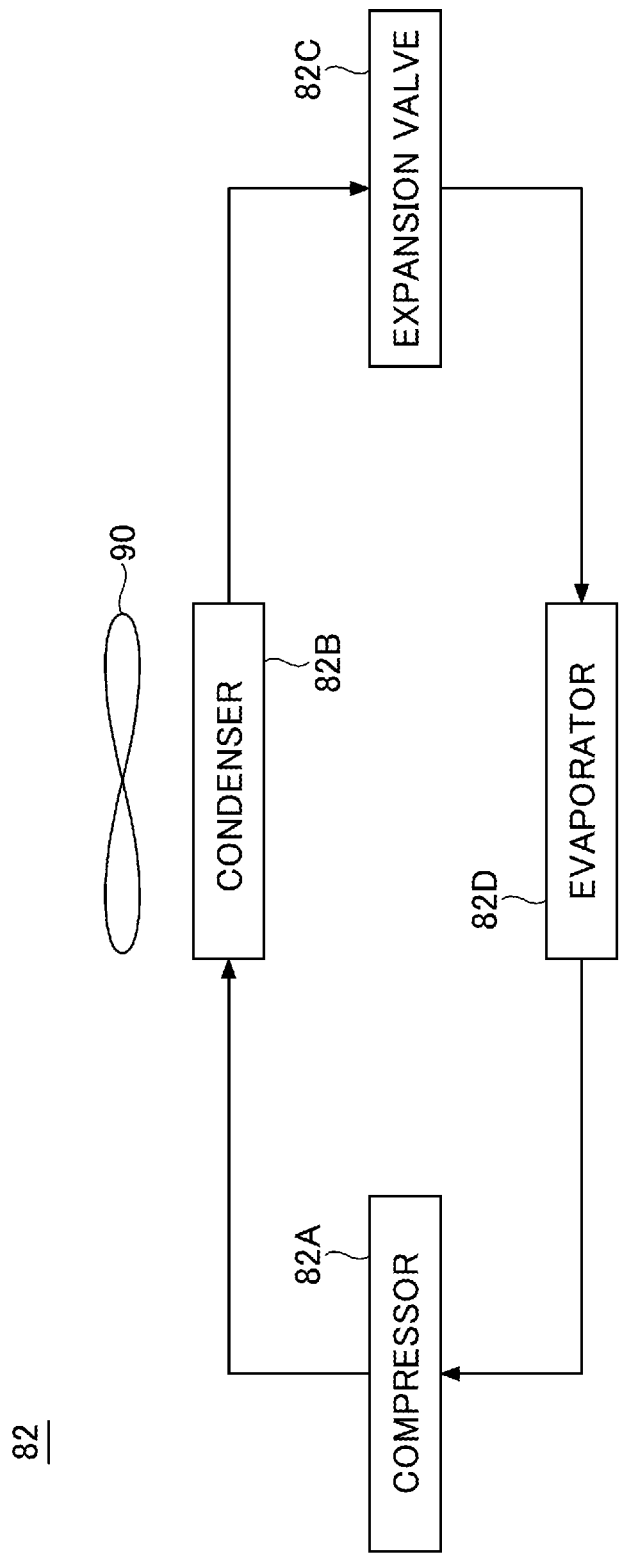
FIG. 4 is a diagram illustrating an example of a heat pump cycle of an air conditioning device.

As illustrated in FIG. 4, the heat pump cycle 82 includes a compressor 82A, a condenser 82B, an expansion valve 82C, and an evaporator 82D.

Note that the arrow in FIG. 4 represents the flow of the refrigerant during the cooling operation of the air conditioning device 80, and the flow of the refrigerant during the heating operation of the air conditioning device 80 is reversed.

The compressor 82A compresses the refrigerant in the heat pump cycle 82. The compressor 82A includes, for example, a built-in motor, an inverter circuit for driving the motor, and the like, and is electrically driven by electric power supplied from the power storage device 19. The refrigerant compressed by the compressor 82A is sent to the condenser 82B during the cooling operation of the air conditioning device 80, and is sent to the evaporator 82D during the heating operation of the air conditioning device 80.

The compressor 82A may be mechanically driven by the pump motor 12.

The condenser 82B (an example of a predetermined device) cools refrigerant in a gas state in which the temperature has risen to a relatively high level due to the refrigerant being compressed by the compressor 82A during the cooling operation of the air conditioning device 80. Specifically, the condenser 82B dissipates the heat of the refrigerant to the outside air by exchanging heat between the refrigerant flowing through the inside and the outside air to cool the refrigerant. The refrigerant cooled by the condenser 82B changes to a liquid state.

Conversely, during a heating operation of the air conditioning device 80, the condenser 82B takes heat from the outside air by exchanging heat between the refrigerant flowing through the inside and the outside air. The temperature of the refrigerant, which is decompressed through the expansion valve 82C and lowered to a relatively low temperature, is raised.

The expansion valve 82C sharply lowers the pressure of the flowing refrigerant to lower the temperature of the refrigerant. During the cooling operation of the air conditioning device 80, the expansion valve 82C sharply lowers the pressure of the high-pressure refrigerant in a liquid state sent from the condenser 82B to lower the temperature of the refrigerant. Conversely, during the heating operation of the air conditioning device 80, the expansion valve 82C sharply lowers the pressure of the high-pressure refrigerant in a liquid state sent from the evaporator 82D to lower the temperature of the refrigerant.

The evaporator 82D exchanges heat between the refrigerant flowing through the inside and the air sent from the air conditioning device 80 into the cabin 10. During the heating operation of the air conditioning device 80, the evaporator 82D cools the air sent into the cabin 10 in a manner in which the relatively low temperature refrigerant (gas-liquid mixed state) sent from the expansion valve 82C takes heat from the air. Further, during the heating operation of the air conditioning device 80, the evaporator 82D heats the air sent into the cabin 10 by releasing heat to the air from the relatively high temperature refrigerant (gas state) sent from the compressor 82A.

The fan 90 operates under the control of the control device 30 (for example, the controller 30A) and blows air toward a predetermined device (hereinafter, "heat exchanging device") that exchanges heat with air. The fan 90 operates on the electric power supplied from, for example, the DC-DC converter 44 or the battery 46.

For example, as illustrated in FIG. 3, the fan 90 may blow air toward the radiator 62 to cool the radiator 62. As a result, air capable of exchanging heat with the refrigerant flowing through the inside is sequentially supplied around the radiator 62, and the degree of cooling of the refrigerant by the radiator 62 can be increased.

Further, for example, as illustrated in FIG. 4, the fan 90 may blow air toward the condenser 82B to cool or heat the condenser 82B. As a result, air capable of exchanging heat with the refrigerant flowing through the inside is sequentially supplied around the condenser 82B, and the degree of cooling or heating of the refrigerant by the condenser 82B can be increased.

An oil cooler (an example of a predetermined device) for cooling the hydraulic oil of the hydraulic driving system may be provided. The oil cooler is provided in, for example, an oil returning passage between the control valve 17 and the hydraulic oil tank T, and exchanges heat between the surrounding air and the hydraulic oil flowing through the inside to cool the hydraulic oil. In this case, the fan 90 may blow air toward the oil cooler to cool the oil cooler. As a result, air capable of exchanging heat with the hydraulic oil flowing through the inside is sequentially supplied around the oil cooler, and the degree of cooling of the hydraulic oil by the oil cooler can be increased.

The number of fans 90 may be one, or may be more than one as described later. That is, the number of fans 90 may be configured in any number as long as the degree of heat exchange (degree of cooling or degree of heating) required for a heat exchanging device can be secured.

[Arrangement of Power Storage Device]

Next, with reference to FIG. 5 to FIG. 8, the arrangement of various devices in the upper turning body 3 including the arrangement of the power storage device 19 will be described.

<Arrangement of Power Storage Device Example>

Figure 5:
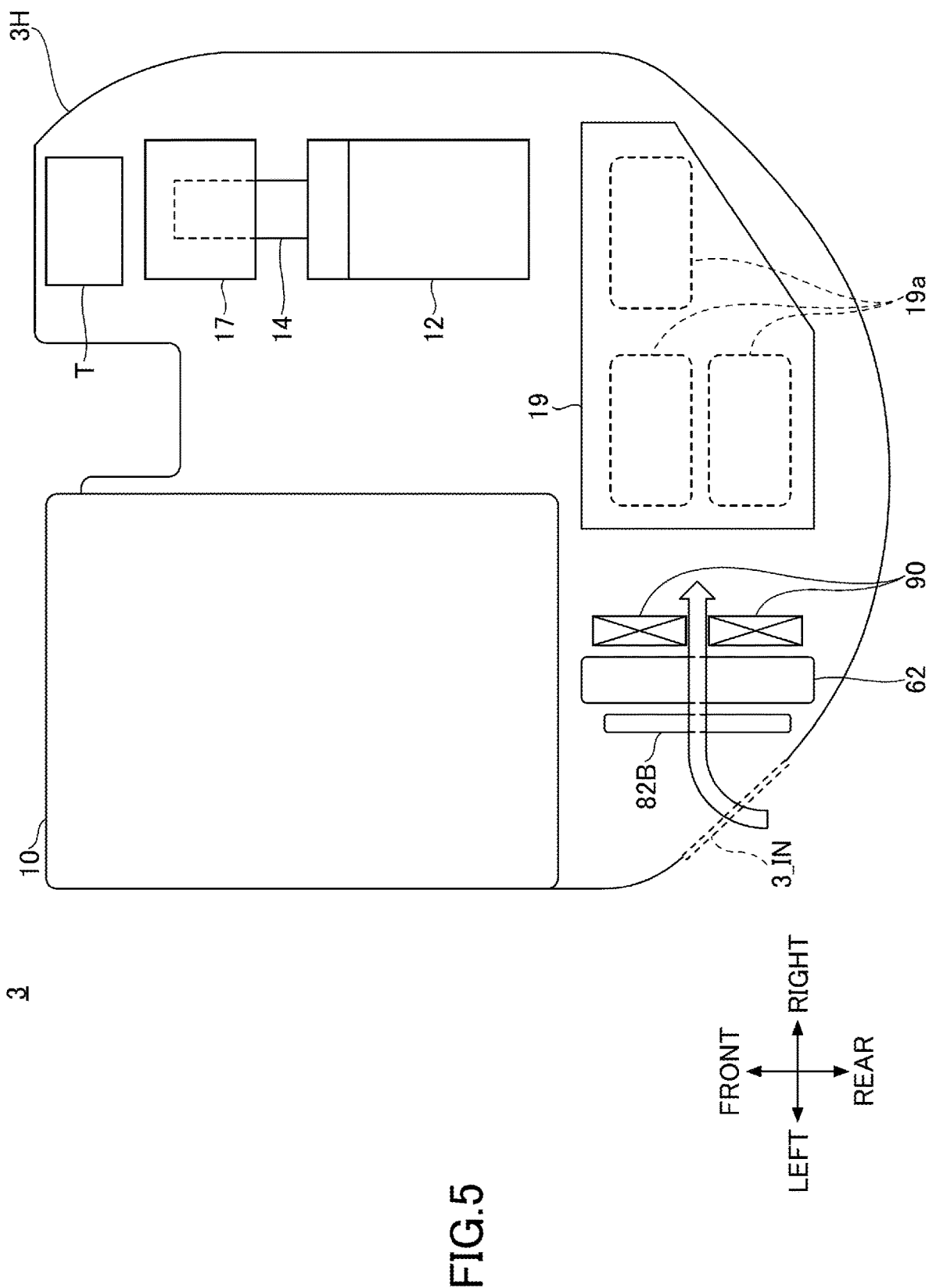
FIG. 5 is a top view illustrating an example of an arrangement of various devices of an upper turning body.
Figure 6:
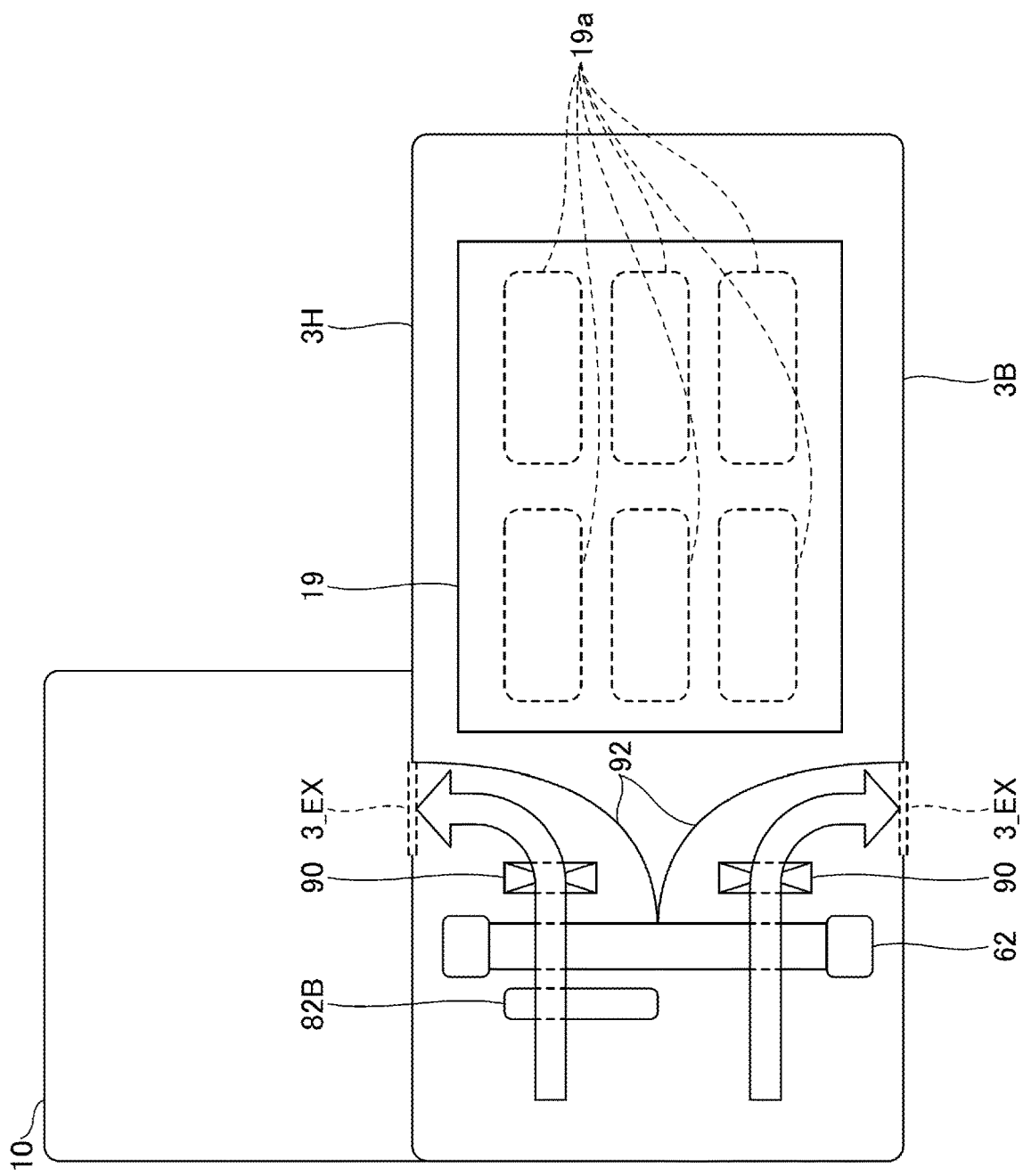
FIG. 6 is a rear view illustrating an example of the arrangement of various devices of the upper turning body.

FIG. 5 and FIG. 6 are a top view and a rear view illustrating an example of the arrangement of various devices of the upper turning body 3.

Note that FIG. 5 illustrates a state in which the upper surface of a house portion 3H is removed so that various devices covered by the house portion 3H of the upper turning body 3 are exposed when viewed from above. Similarly, FIG. 6 illustrates a state in which the rear surface of the house portion 3H is removed so that various devices covered by the house portion 3H of the upper turning body 3 are exposed when viewed from the rear.

As illustrated in FIG. 5 and FIG. 6, in the present example, the power storage device 19 is mounted in a range extending from the central portion to the right end portion at the rear portion of the upper turning body 3 in the left-right direction.

The power storage device 19 includes multiple battery modules 19a. In the present example, the power storage device 19 includes nine battery modules 19a, and is arranged in a manner in which three battery modules 19a are stacked in three stages inside the housing.

The pump motor 12, the main pump 14, the control valve 17, and the hydraulic oil tank T are arranged in a range extending from the front portion to the central portion in the front-rear direction at the right side of the upper turning body 3.

The pump motor 12 is arranged at the central portion in the front-rear direction at the right side of the upper turning body 3. Further, the pump motor 12 is arranged such that the rotation shaft extends in the front-rear direction and the output shaft extends forward.

The main pump 14 is arranged adjacent to the pump motor 12 in such a manner that the input shaft of the main pump 14 is connected to the output shaft of the pump motor 12.

The control valve 17 is arranged on the main pump 14. For example, the pump motor 12 and the main pump 14 are arranged at relatively low positions in the space between a bottom portion 3B (turning frame) of the upper turning body 3 and the house portion 3H. The control valve 17 may be arranged at a relatively high position in the space.

The hydraulic oil tank T is arranged at the front end at the right side of the upper turning body 3 in a manner adjacent to the main pump 14 and the control valve 17.

The radiator 62, the condenser 82B, and the fan 90 are arranged on the left side at the rear portion of the upper turning body 3, that is, on the left side of the power storage device 19.

The radiator 62 is arranged approximately perpendicular to the bottom portion 3B (turning frame) of the upper turning body 3 so that the front-rear direction is approximately the longitudinal direction (width direction) and the left-right direction is approximately the transverse direction (thickness direction). The "approximately" is intended to allow, for example, manufacturing errors in the excavator 100 and the devices mounted on the excavator 100. Hereinafter, the "approximately" is used with the same intention. As a result, the radiator 62 can exchange heat by introducing air between the fins of a core and allowing the air to flow through in the left-right direction (the shorter direction). For example, as illustrated in FIG. 5 and FIG. 6, the radiator 62 is a downflow type and tanks are arranged at both ends in the vertical direction.

The condenser 82B is arranged adjacent to the left side of the radiator 62. The condenser 82B is arranged in series with the radiator 62 with respect to the airflow. That is, similar to the radiator 62, the condenser 82B is approximately perpendicular to the bottom of the upper turning body 3 so that the front-rear direction is approximately the longitudinal direction (width direction) and the left-right direction is approximately the transverse direction (thickness direction). The condenser 82B is less than half the height dimension of the radiator 62, and in the present example, the condenser 82B is arranged such that the condenser 82b covers a region of approximately the upper half on the left side of the radiator 62.

Alternatively, other heat exchanging devices may be arranged adjacent to the radiator 62 and the condenser 82B. For example, an oil cooler may be arranged such that the oil cooler is adjacent to the left side of the radiator 62 and the lower side of the condenser 82B. Hereinafter, the same may be applied to the cases of other examples described later.

Four fans 90 are arranged such that the four fans 90 are adjacent to the right side of the radiator 62. The four fans 90 are arranged in two rows in the longitudinal direction (front-rear direction) of the radiator 62 and arranged in two stages in the height direction (vertical direction). The fan 90 blows air to the radiator 62, the condenser 82B, and the like in a manner of drawing air from the radiator 62 side (left side) to the right side.

Note that the fan 90 may be arranged such that the fan 90 is adjacent to the left side of the condenser 82B, the radiator 62, or the like. In this case, the fan 90 blows air to the radiator 62, the condenser 82B, and the like in a manner of pushing air from the left side to the condenser 82B and the radiator 62 side (right side). Hereinafter, the same may be applied to the cases of other examples described later.

An inlet port 3_IN for introducing air from the outside is provided on the side surface of the left corner of the rear portion of the house portion 3H of the upper turning body 3. The inlet port 3_IN may include, for example, multiple through holes formed in a mesh shape or a slit shape. Hereinafter, the same may be applied to an outlet port 3_EX which will be described later. As a result, the fan 90 can generate a rightward airflow inside the upper turning body 3 to introduce external air having a relatively low temperature from the inlet port 3_IN into the inside of the upper turning body 3 (space between the house portion 3H and the bottom portion 3B) (refer to the outlined arrow in FIG. 5).

Further, in the rear portion of the upper turning body 3, the outlet ports 3_EX for discharging the air inside the upper turning body 3 to the external are arranged on the upper surface and the bottom portion 3B of the house portion 3H. The outlet ports 3_EX are arranged between the power storage device 19 and the fan 90 in the left-right direction.

An exhaust duct 92 is provided between the right side surface of the radiator 62 and the upper and lower exhaust ports 3_EX.

The exhaust duct 92 (an example of a flow changing member) is provided such that the exhaust 92 faces each of the upper and lower outlet ports 3_EX from the central portion in the vertical direction of the right side surface of the radiator 62. The exhaust duct 92 changes the direction of the flow so that the air drawn to the right by the operation of the fan 90 is directed to the upper and lower outlet ports 3_EX. Specifically, the exhaust duct 92 can change the direction of the airflow drawn by the upper fan 90 from the right direction to the upper right direction to discharge to the outside of the upper turning body 3 from the outlet port 3_EX on the upper surface of the house portion 3H (refer to the upper outlined arrow in FIG. 6). Similarly, the exhaust duct 92 can change the direction of the airflow drawn by the lower fan 90 from the right direction to the lower right direction to discharge to the outside of the upper turning body 3 from the outlet port 3_EX on the lower surface of the bottom portion 3B (refer to the lower outlined arrow in FIG. 6). Therefore, the exhaust duct 92 can prevent the air that has passed through the condenser 82B and the radiator 62 and has a relatively high temperature to reach the power storage device 19 arranged on the right side of the radiator 62. Accordingly, in the excavator 100, the refrigerant introduced into the power storage device 19 from the cooling circuit 60 is warmed by the relatively high temperature air that has passed across the condenser 82B and the radiator 62. Therefore, a situation in which the cooling performance of the power storage device 19 deteriorates by the cooling circuit 60 can be prevented.

The outlet port 3_EX may be arranged on the rear surface of the house portion 3H between the fan 90 and the power storage device 19 in the left-right direction. In this case, the exhaust duct 92 may be configured to change the flow of air drawn by the fan 90 from the right direction to the rear direction for guiding the airflow to the outlet port 3_EX. Further, instead of the exhaust duct 92, a member (an example of a flow changing member) that only changes the direction of the airflow from the right direction to another direction (for example, forward direction) may be provided. In this case, for example, the outlet port 3_EX may be provided at the front portion of the upper turning body. As a result, the airflow being changed to the forward direction is directed to the outlet port 3_EX. Therefore, the excavator 100 can discharge relatively high temperature air that has passed across the condenser 82B and the radiator 62 from the outlet port 3_EX.

As described above, in the present example, the exhaust duct 92 is provided so that the power storage device 19 is arranged apart from the flowing path in which the air outside the upper turning body 3, by the operation of the fan 90, is introduced into the inside, passes across the condenser 82B and the radiator 62, and is discharged to the outside. As a result, the excavator 100 can appropriately cool the power storage device 19 by the cooling circuit 60 and the progress of deterioration due to the temperature rise can be prevented.

Further, the radiator 62, the condenser 82B, and the like are cooled by relatively low temperature air introduced from the inlet port 3_IN in proximity to the radiator 62 and the condenser 82B by the operation of the fan 90. Therefore, the excavator 100 can appropriately cool the radiator 62, the condenser 82B, the cooling circuit 60, and the refrigerant of the heat pump cycle 82 by the operation of the inlet port 3_IN and the fan 90.

<Another Example of Arrangement of Power Storage Device>

Figure 7:
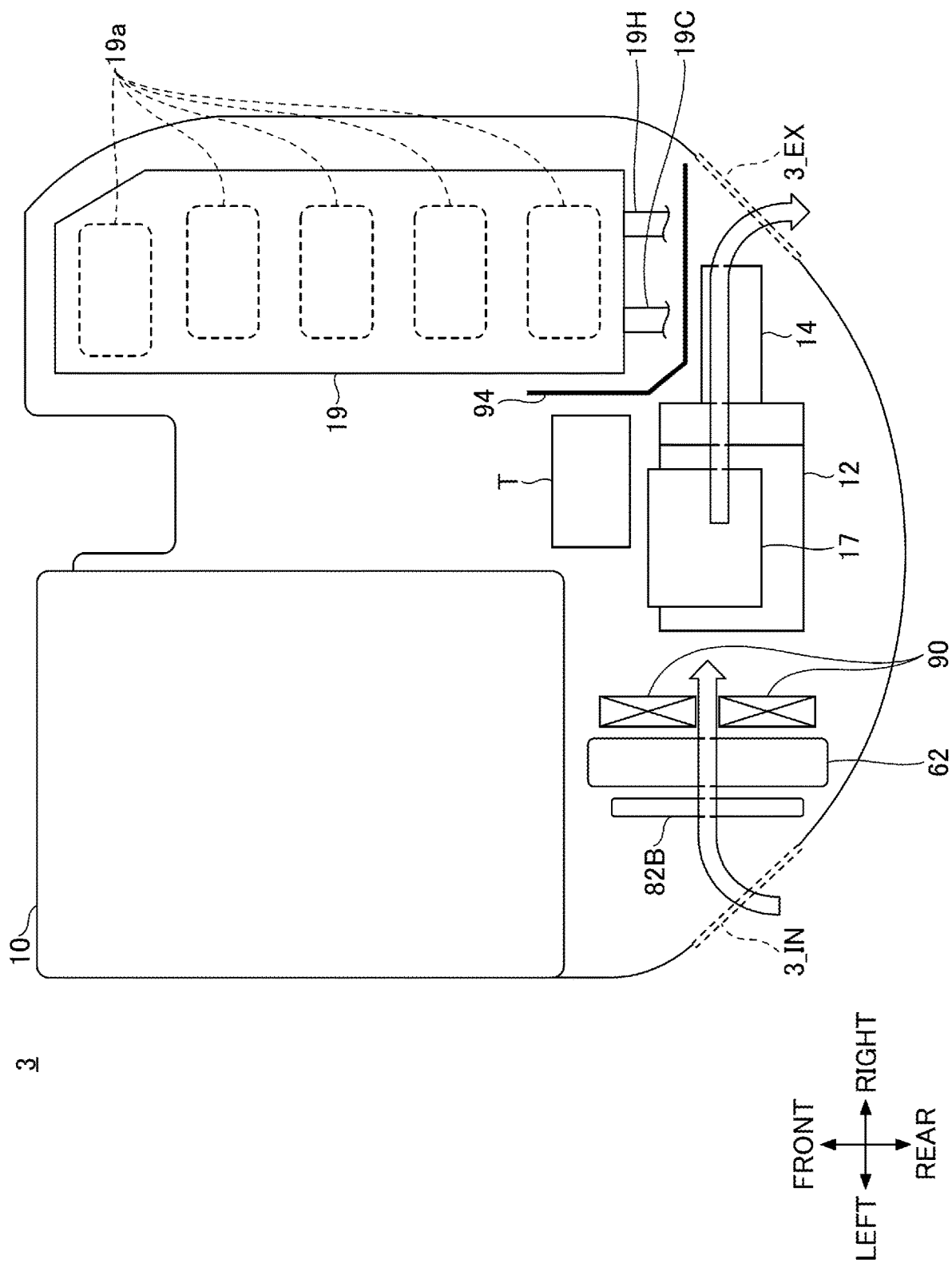
FIG. 7 is a top view illustrating another example of the arrangement of various devices of the upper turning body.

FIG. 7 and FIG. 8 are a top view and a right side view illustrating another example of the arrangement of various devices of the upper turning body 3.

Note that FIG. 7 illustrates a state in which the upper surface of a house portion 3H is removed so that various devices covered by the house portion 3H of the upper turning body 3 are exposed when viewed from above. Similarly, FIG. 8 illustrates a state in which the right side surface of the house portion 3H is removed so that various devices covered by the house portion 3H of the upper turning body 3 are exposed when viewed from the right side.

As illustrated in FIG. 7 and FIG. 8, in the present example, a power storage device 19 is mounted in a range extending from the front portion to the central portion in the front-rear direction at the right side of the upper turning body 3.

The power storage device 19 includes 15 battery modules 19a, and is arranged in a manner in which five battery modules 19a are stacked in three stages inside the housing.

A cable 19C and a hose 19H are connected to the rear end of the power storage device 19.

The cable 19C (an example of a power cable) is a power line connecting the power storage device 19 and a device that receives power from the power storage device 19. The cable 19C includes multiple cables electrically connected to each of, for example, a DC bus 42, a compressor 82A, a DC-DC converter 44, and a charging port for charging from an external power source.

In FIG. 7, one cable 19C is drawn in a manner representing multiple cables. Further, as illustrated in FIG. 7, multiple cables may be connected to the connector of the power storage device 19 by being integrated into a single cable 19C.

The hose 19H (an example of a refrigerant hose) allows the refrigerant of the cooling circuit 60 to flow through the inside. The hose 19H includes two hoses corresponding to the refrigerant flow paths 66B and 66C. As a result, the cooling circuit 60 can introduce the refrigerant into the housing (water jacket) of the power storage device 19, cool each battery module 19a, and discharge the refrigerant to the outside after exchanging heat with the battery module 19a to the power storage device 19.

Note that in FIG. 7, one hose 19H is drawn in a manner representing two hoses.

A pump motor 12, a main pump 14, a control valve 17, and a hydraulic oil tank T are provided in a range extending from the central portion to the right end portion at the rear portion of the upper turning body 3 in the left-right direction.

The pump motor 12 is arranged at the center of the rear portion of the upper turning body 3 in the left-right direction. Further, the pump motor 12 is arranged such that the rotation shaft extends in the left-right direction and the output shaft extends in the right direction.

The main pump 14 is arranged adjacent to the right side of the pump motor 12 in such a manner that the input shaft of the main pump 14 is connected to the output shaft of the pump motor 12.

The control valve 17 is arranged at the center of the rear portion of the upper turning body 3 in the left-right direction and is arranged above the pump motor 12. For example, as illustrated in FIG. 8, the pump motor 12 and the main pump 14 are arranged at relatively low positions in the space between the bottom portion 3B of the upper turning body 3 and the house portion 3H, and the control valve 17 is arranged at a relatively high position in the space.

The hydraulic oil tank T is arranged at the center of the rear portion of the upper turning body 3 in the left-right direction and adjacent to the front of the pump motor 12.

A radiator 62, a condenser 82B, and a fan 90 are arranged on the left side of the rear portion of the upper turning body 3, that is, on the left side of the pump motor 12, the main pump 14, and the control valve 17.

The arrangement of the radiator 62, the condenser 82B, and the fan 90 is the same as in the previously described example.

As in the case of the previously described example, an inlet port 3_IN for introducing air from the outside is provided on the side surface of the left corner of the rear portion of the house portion 3H of the upper turning body 3. As a result, the fan 90 can generate a rightward airflow inside the upper turning body 3 to introduce external air having a relatively low temperature from the inlet port 3_IN into the inside of the upper turning body 3 (space between the house portion 3H and the bottom portion 3B) (refer to the left outlined arrow in FIG. 7).

An outlet port 3_EX for discharging air to the outside is provided on the side surface of the right corner of the rear portion of the house portion 3H of the upper turning body 3. As a result, the air that has been heated by exchanging heat with the radiator 62, the condenser 82B, and the like can be discharged to the outside of the upper turning body 3 from the outlet port 3_EX along the rightward airflow generated by the fan (refer to the right outlined arrow in FIG. 7).

Further, the airflow generated by the fan 90 crosses the rear portion of the upper turning body 3 in the left-right direction. Therefore, the excavator 100 can make it unlikely for the air whose temperature has become relatively high due to exchanging heat between the radiator 62 and the condenser 82B to reach the power storage device 19. Accordingly, in the excavator 100, the refrigerant introduced into the power storage device 19 from the cooling circuit 60 is warmed by the relatively high temperature air that has passed across the condenser 82B and the radiator 62. Therefore, a situation in which the cooling performance of the power storage device 19 deteriorates by the cooling circuit 60 can be prevented.

Further, a shielding plate 94 (an example of a shielding member) is arranged behind the power storage device 19. The shielding plate 94 partitions the rear portion of the fan 90, that is, between the path of the airflow generated by the fan 90 and the power storage device 19.

Specifically, the shielding plate 94 is arranged such that the shielding plate 94 forms a partition between the power storage device 19 and the pump motor 12, the main pump 14, the control valve 17, and the hydraulic oil tank T. As a result, the excavator 100 can ensure that the air whose temperature has become relatively high due to exchanging heat between the radiator 62 and the condenser 82B does not reach the power storage device 19.

Further, the shielding plate 94 is configured such that the cable 19C and the hose 19H connected to the rear end of the power storage device 19 are provided in the space between the shielding plate 94 and the power storage device 19. Specifically, the cable 19C and the hose 19H are arranged such that the cable 19C and the hose 19H do not to straddle the upper and lower portion of the shielding plate 94 or penetrate the shielding plate 94. As a result, the air whose temperature has become relatively high due to exchanging heat between the radiator 62 and the condenser 82B can be prevented from entering the surroundings of the power storage device 19 from a gap between the cable 19C and the hose 19H and the top and bottom of the shielding plate 94 and the through hole. Therefore, the excavator 100 can more reliably prevent the air whose temperature has become relatively high due to exchanging heat between the radiator 62 and the condenser 82B from reaching the power storage device 19.

Note that the shielding plate 94 may be omitted as long as the cooling performance required for the power storage device 19 is secured. For example, the size (dimensions) of the power storage device 19 may be changed by a power storage capacity determined by conditions such as required operating time. Therefore, when the dimension of the power storage device 19 in the front-rear direction is relatively small and the rear end portion of the power storage device 19 is relatively apart far from the rear portion of the upper turning body 3, the air generated by the fan 90 is less likely to reach the power storage device 19. Therefore, the shielding plate 94 may be omitted in this case.

As described above, in the present example, the power storage device 19 is arranged in the front portion on the right side such that the power storage device 19 is apart from the flowing path in which the air outside the upper turning body 3, by the operation of the fan 90, is introduced into the inside, passes across the condenser 82B and the radiator 62, and is discharged to the outside. As a result, the excavator 100 can appropriately cool the power storage device 19 by the cooling circuit 60 and the progress of deterioration due to the temperature rise can be prevented.

Further, as in the case of the previously described example, the radiator 62, the condenser 82B, and the like are cooled by relatively low temperature air introduced from the inlet port 3_IN in proximity to the radiator 62 and the condenser 82B by the operation of the fan 90. Therefore, the excavator 100 can appropriately cool the radiator 62, the condenser 82B, the cooling circuit 60, and the refrigerant of the heat pump cycle 82 by the operation of the inlet port 3_IN and the fan 90.

[Functions]

Next, the effects of the excavator 100 according to the present embodiment will be described.

According to the present embodiment, the excavator 100 includes the lower traveling body 1, the upper turning body 3, the actuator, the power storage device 19, the cooling circuit 60, and the fan 90. Specifically, the upper turning body 3 is turnably mounted on the lower traveling body 1. Further, the actuator drives a driven portion including the lower traveling body 1 and the upper turning body 3. Further, the power storage device 19 is mounted on the upper turning body 3 and is an energy source for driving the actuator. Further, the cooling circuit 60 cools the power storage device 19. Further, the fan 90 is mounted on the upper turning body 3 and blows air to a heat exchanging device (for example, the radiator 62 or the condenser 82B) for cooling the heat exchanging device. Further, the power storage device 19 is arranged such that the power storage device 19 is apart from a path in which air outside the upper turning body 3, by an operation of the fan 90, is introduced into inside the upper turning body 3, passes across the heat exchanging device, and is discharged to the outside of the upper turning body 3.

Accordingly, the heat exchanging device is cooled by the air blown by the fan 90. Further, the power storage device 19 is cooled by the cooling circuit 60, and also is less likely to be exposed to a relatively high temperature airflow (wind) that has passed across the heat exchanging device. Therefore, the excavator 100 can appropriately cool multiple devices including the power storage device 19.

Further, in the present embodiment, the power storage device 19 may be mounted on the front right portion of the upper turning body 3.

Accordingly, the power storage device 19 is arranged in the space centered on the front right corner of the upper turning body 3 in the top view. Therefore, the excavator 100 can generate an airflow path for cooling the heat exchanging device by the operation of the fan 90 in another space of the upper turning body 3. As a result, the excavator 100 separates the space in which the power storage device 19 is arranged from the space in which the airflow path for cooling the heat exchanging device is provided. It is possible to make it unlikely for the relatively high temperature air that has passed across the heat exchanging device to reach the power storage device 19 by the operation of the fan 90. Therefore, the excavator 100 can appropriately cool multiple devices including the power storage device 19.

Further, in the present embodiment, the power storage device 19 may be arranged in a range extending over the front right portion and the central right portion of the upper turning body 3. Then, by the operation of the fan 90, the path where the air outside the upper turning body 3 is introduced into the upper turning body 3, passes across the heat exchanging device, and is discharged to the outside of the upper turning body 3 may be arranged at the rear portion of the upper turning body 3.

Specifically, according to the excavator 100, the space in which the power storage device 19 is arranged can be separated the from the space in which the airflow path for cooling the heat exchanging device is provided.

Further, in the present embodiment, the airflow path for cooling the heat exchanging device may be arranged on the left and right sides of the rear portion of the upper turning body 3. Further, the shielding plate 94 may be arranged between the rear end portion of the power storage device 19 and the airflow path for cooling the heat exchanging device.

Accordingly, the excavator 100 can ensure that the relatively high temperature air that has passed across the heat exchanging device does not reach the power storage device 19 by the operation of the fan 90.

Further, in the present embodiment, the shielding plate 94 may be arranged such that the cable 19C and the refrigerant hose 19H of the cooling circuit 60 which are connected to power storage device 19 are provided in the space between the shielding plate 94 and the power storage device 19.

Accordingly, the cable 19C and the hose 19H may be arranged so as not to straddle the upper and lower portion of the shielding plate 94 or penetrate the shielding plate 94. Therefore, the air whose temperature has become relatively high due to exchanging heat between the radiator 62 and the condenser 82B can be prevented from entering the surroundings of the power storage device 19 from a gap between the cable 19C and the hose 19H and the top and bottom of the shielding plate 94 and the through hole. Accordingly, the excavator 100 can more reliably prevent the relatively high temperature air that has passed across the heat exchanging device from reaching the power storage device 19 by the operation of the fan 90.

Further, in the present embodiment, the excavator 100 may include a flow changing member that changes the direction of the airflow passing across the heat exchanging device so as not to reach the power storage device 19 by the operation of the fan 90.

Accordingly, the excavator 100 separates the space in which the power storage device 19 is arranged from the space in which the airflow path for cooling the heat exchanging device is provided. It is possible to prevent the relatively high temperature air that has passed across the heat exchanging device from reaching the power storage device 19 by the operation of the fan 90. Therefore, the excavator 100 can appropriately cool multiple devices including the power storage device 19.

Further, in the present embodiment, the heat exchanging device or the fan 90 and the power storage device 19 may be arranged such that the heat exchanging device or the fan 90 and the power storage device 19 are adjacent to each other. The flow changing member may be an exhaust duct 92 that discharges the air that has passed across the heat exchanging device toward the outside of the upper turning body 3.

Specifically, the excavator 100 can separate the space in which the power storage device 19 is arranged from the space in which the airflow path for cooling the heat exchanging device is provided.

[Modification/Variation]

While the embodiments have been described in detail above, the present disclosure is not limited to such specific embodiments, and various modifications and variations are possible within the scope of the present disclosure as defined in the appended claims.

For example, in the above-described embodiment, the arrangement of various devices (the power storage device 19 or the heat exchanging devices to be cooled by the fan 90) of the excavator 100 without an engine has been described, but the same arrangement may be applied to an excavator that includes an engine. That is, the arrangement of various devices of the excavator 100 of the above-described embodiment may be applied to a hybrid excavator. Specifically, a radiator that cools the engine may be arranged adjacent to the radiator 62, the condenser 82B, and the like so as to be cooled by the fan 90.

Further, in the above-described embodiment and examples of modification/variation, the arrangement of various devices mounted on the excavator 100 has been described, but the same arrangement may be applied to other working machines that include a power storage device, a heat exchanging device, a fan, and the like. Other working machines include, for example, an industrial vehicle, a forklift, a crane, a bulldozer, and the like.

Finally, the present application claims priority under Japanese Patent Application No. 2020-188896, filed on Nov. 12, 2020, the entire contents of which are hereby incorporated by reference.

REFERENCE SIGNS LIST 1 lower traveling body (driven portion)
1A, 1B traveling hydraulic motor (actuator)
3 upper turning body (driven portion)
3_EX outlet port
3_IN inlet port
3B bottom portion
3H house portion
4 boom
5 arm
6 bucket
7 boom cylinder (actuator)
8 arm cylinder (actuator)
9 bucket cylinder (actuator)
12 pump motor (motor)
14 main pump (hydraulic pump)
18 inverter unit
18A inverter
18B inverter
19 power storage device
19a battery module
19C cable (power cable)
19H hose (refrigerant hose)
20 turning driving device
21 turning motor (actuator)
26 operation device
30 control device
30A to 30C controller 44 DC-DC converter
46 battery
60 cooling circuit (cooling device)
62 radiator (predetermined device)
64 water pump
80 air conditioning device
82 heat pump cycle
82A compressor
82B condenser (predetermined device)
82C expansion valve
82D evaporator
90 fan
92 exhaust duct (flow changing member)
94 shielding plate (shielding member)

What is claimed is:

1. An excavator comprising:
a lower traveling body;
an upper turning body turnably mounted on the lower traveling body;
a plurality of actuators configured to drive driven portions including the lower traveling body and the upper turning body;
an electric motor provided on the upper turning body;
a hydraulic pump provided on the upper turning body and configured to be driven by the electric motor to discharge hydraulic oil to drive one or more of the plurality of actuators;
a power storage mounted on the upper turning body and connected to the electric motor to be used as an energy source for driving the actuators;
a cooling circuit configured to cool the power storage; and
a fan mounted on the upper turning body and configured to blow air to a predetermined device for cooling the predetermined device,
wherein the power storage, the electric motor, and the hydraulic pump are arranged in such a manner as to be apart from a path in which air outside the upper turning body, by an operation of the fan, is introduced into inside the upper turning body, passes across the predetermined device, and is discharged to the outside of the upper turning body.

2. The excavator according to claim 1, wherein the electric motor and the hydraulic pump are arranged in a range extending from a front portion to a central portion in a front-rear direction at a right side of the upper turning body.

3. An electric excavator without an engine, comprising:
a lower traveling body;
an upper turning body turnably mounted on the lower traveling body;
a plurality of actuators configured to drive a driven portion including the lower traveling body and the upper turning body;
an electric motor provided on the upper turning body;
a hydraulic pump provided on the upper turning body and configured to be driven by the electric motor to discharge hydraulic oil to drive one or more of the plurality of actuators;
a power storage mounted on the upper turning body and connected to the electric motor to be used as an energy source for driving the actuators;
a cooling circuit configured to cool the power storage; and
a fan mounted on the upper turning body and configured to blow air to a predetermined device for cooling the predetermined device,
wherein the power storage is mounted on a front right portion of the upper turning body.

4. The excavator according to claim 3, wherein the power storage is arranged in a range extending from the front right portion to a central right portion of the upper turning body, and
a path is arranged at a rear portion of the upper turning body, the path in which air outside the upper turning body, by an operation of the fan, is introduced into inside the upper turning body, passes across the predetermined device, and is discharged to the outside of the upper turning body.

5. The excavator according to claim 4, wherein the path is arranged at left and right sides of the rear portion of the upper turning body, and
a shielding member is arranged between a rear end of the power storage and the path.

6. The excavator according to claim 5, wherein the shielding member is arranged such that space between the shielding member and the power storage includes a power cable and a refrigerant hose of the cooling circuit, and
the power cable and the refrigerant hose are connected to the power storage.

7. The excavator according to claim 3, wherein the fan is configured to introduce the air from an outside of the excavator through an inlet port provided in a side surface of a house portion of the upper turning body at a rear left corner of the house portion, so that the introduced air passes the predetermined device to be discharged to the outside through an outlet port provided in a side surface of the house portion at a rear right corner of the house portion.

8. The excavator according to claim 3, wherein the fan is placed in a rear left portion of the upper turning body.

9. The excavator according to claim 8, wherein the fan is configured to generate a flow of the air toward a rear right portion of the upper turning body.

10. The excavator according to claim 9, further comprising:
a shielding plate placed in a rear of the power storage,
wherein the predetermined device is provided upstream of the fan in a path of the flow of the air generated by the fan, and
the shielding plate forms a partition between the power storage and the path of the flow of the air to prevent the air passing the predetermined device from reaching the power storage.

11. The excavator according to claim 10, wherein
the shielding plate is placed between the power storage and each of the hydraulic pump and the electric motor.

12. An excavator comprising:
a lower traveling body;
an upper turning body turnably mounted on the lower traveling body;
a plurality of actuators configured to drive a driven portions including the lower traveling body and the upper turning body;
an electric motor provided on the upper turning body;
a hydraulic pump provided on the upper turning body and configured to be driven by the electric motor to discharge hydraulic oil to drive one or more of the plurality of actuators;
a power storage mounted on the upper turning body and connected to the electric motor to be used as an energy source for driving the actuators;
a cooling circuit configured to cool the power storage;
a fan mounted on the upper turning body and configured to blow air to a predetermined device for cooling the predetermined device; and a flow changing member configured to change a direction of flow of air that has passed across the predetermined device by an operation of the fan to prevent the air from reaching the power storage, the electric motor, and the hydraulic pump.

13. The excavator according to claim 12, wherein the predetermined device or the fan is arranged such that the predetermined device or the fan is adjacent to the power storage, and the flow changing member is an exhaust duct for discharging the air that has passed across the predetermined device toward an outside of the upper turning body.

14. The excavator according to claim 12, wherein the electric motor and the hydraulic pump are arranged in a range extending from a front portion to a central portion in a front-rear direction at a right side of the upper turning body.

* * * * *